(12) United States Patent
Sohma et al.

(10) Patent No.: US 10,284,075 B2
(45) Date of Patent: May 7, 2019

(54) OVERVOLTAGE PROTECTION CIRCUIT FOR PROTECTING OVERVOLTAGE CORRESPONDING TO WIDE RANGE OF INPUT VOLTAGE

(71) Applicants: RICOH ELECTRONIC DEVICES CO., LTD., Osaka (JP); NATIONAL UNIVERSITY CORPORATION OITA UNIVERSITY, Oita (JP)

(72) Inventors: Shohtaroh Sohma, Osaka (JP); Yuji Takeyama, Osaka (JP); Kimihiro Nishijima, Kumamoto (JP)

(73) Assignees: RICOH ELECTRONIC DEVICES CO., LTD., Osaka (JP); NATIONAL UNIVERSITY CORPORATION OITA UNIVERSITY, Oita (JP)

( * ) Notice: Subject to any disclaimer, the term of this patent is extended or adjusted under 35 U.S.C. 154(b) by 0 days.

(21) Appl. No.: 16/052,136

(22) Filed: Aug. 1, 2018

(65) Prior Publication Data

US 2019/0058323 A1 Feb. 21, 2019

(30) Foreign Application Priority Data

Aug. 2, 2017 (JP) ................................ 2017-150098

(51) Int. Cl.
*H02M 1/32* (2007.01)
*H02H 7/125* (2006.01)
(Continued)

(52) U.S. Cl.
CPC ............ *H02M 1/32* (2013.01); *H02H 7/1252* (2013.01); *H02M 3/33507* (2013.01);
(Continued)

(58) Field of Classification Search
CPC .... H02M 7/1557; H02M 7/1555; H02M 1/32; H02M 2001/32
See application file for complete search history.

(56) References Cited

U.S. PATENT DOCUMENTS 5,469,046 A * 11/1995 Wong .................. H02M 7/2176
323/282
5,687,065 A * 11/1997 Majid ....................... G05F 1/66
323/224

(Continued)

FOREIGN PATENT DOCUMENTS

JP 7-322613 12/1995
JP 2004-187391 7/2004
(Continued)

OTHER PUBLICATIONS

Kimihiro Nishijima, et al., "An Isolated AC/DC Converter with Two Active-Clamp Circuits for Low Power Applications", IECE Tech. Rep., vol. 116, No. 329, EE2016-39, pp. 51-55, 2016.

*Primary Examiner* — Kyle J Moody
(74) *Attorney, Agent, or Firm* — Cooper & Dunham LLP

(57) ABSTRACT

An overvoltage protection circuit is provided which is connected between a rectifier circuit and a load including an input capacitor element connected to both ends of the load. The overvoltage protection circuit includes a semiconductor switch connected between the rectifier circuit and the load, and a control circuit controls the semiconductor switch. When the rectified voltage exceeds a predetermined value, the control circuit turns off the semiconductor switch, and detects a voltage potential difference between both ends of the semiconductor switch, and then, for an interval when the voltage potential difference is zero or a predetermined minute value, the control circuit generates a control voltage for turning on the semiconductor switch, and outputs the control voltage to a control terminal of the semiconductor (Continued)

switch. The overvoltage protection circuit includes a current change circuit that gradually changes a current flowing through the semiconductor switch.

9 Claims, 30 Drawing Sheets

(51) Int. Cl.
  *H02M 3/335* (2006.01)
  *H02M 7/06* (2006.01)
  *H02M 7/155* (2006.01)

(52) U.S. Cl.
  CPC ........... *H02M 7/06* (2013.01); *H02M 7/1555* (2013.01); *H02M 7/1557* (2013.01)

(56) References Cited

U.S. PATENT DOCUMENTS

| | | | | |
|---|---|---|---|---|
| 5,801,933 | A * | 9/1998 | Ravid | H02M 7/2176 363/126 |
| 6,018,467 | A * | 1/2000 | Majid | H02M 3/33523 363/16 |
| 6,583,998 | B2 * | 6/2003 | Chiu | H02M 1/4208 320/164 |
| 8,830,637 | B2 * | 9/2014 | Terry | H02H 9/04 361/18 |
| 2003/0053322 | A1 | 3/2003 | Chiu | |
| 2010/0067261 | A1 | 3/2010 | Nakanishi | |
| 2012/0188798 | A1 | 7/2012 | Matsumoto | |

FOREIGN PATENT DOCUMENTS

| | | |
|---|---|---|
| JP | 4294928 | 7/2009 |
| JP | 2012-157085 | 8/2012 |
| JP | 5293006 | 9/2013 |

* cited by examiner

US 10,284,075 B2

OVERVOLTAGE PROTECTION CIRCUIT FOR PROTECTING OVERVOLTAGE CORRESPONDING TO WIDE RANGE OF INPUT VOLTAGE

BACKGROUND OF THE INVENTION

1. Field of the Invention

The present invention relates to an overvoltage protection circuit for protecting an overvoltage corresponding to a predetermined wide range of input voltage and relates to a power supply apparatus for the overvoltage protection circuit.

2. Description of Related Art

A commercial power supply voltage has been known to be different in each country, and commercial power supply voltages with AC voltages from 100 V to 240 V exist. As a power supply apparatus used for these power source voltages, a power supply apparatus exists, which is called a worldwide specification and corresponds to the commercial power supply voltages with AC voltages from 100 V to 240 V. For example, it has been already known that an AC adapter is compatible with the worldwide specification and a single type thereof can be sold to any country, thus enabling reduction in man-hour and cost for inventory management and development.

However, the power supply apparatus of the worldwide specification has a problem where the commercial power supply voltage, namely the input voltage of the power supply apparatus, varies widely, causing an input capacitor to become large especially in a capacitor input method and making it difficult to design a power supply circuit portion.

For solving this problem, there has been known an overvoltage protection circuit that supplies a desired voltage (for example, DC 140 V) to an input capacitor and a power supply circuit portion by clamping an input voltage even when the input voltage is a high voltage (for example, see Patent Document 1).

The overvoltage protection circuit includes, for example, a rectifier circuit that receives an input of an AC voltage, and outputs a rectified voltage, a load including an input capacitor, and a semiconductor switch connected between the rectifier circuit and the load. In this case, the overvoltage protection circuit turns off the semiconductor switch when the rectified voltage exceeds a desired value, and the overvoltage protection circuit turns on the semiconductor switch in an interval when a voltage potential difference (V) between both ends of the semiconductor switch is zero or a predetermined minute value (the minute value is a value close to zero, for example, $-10^{-2}$ to $+10^{-2}$, etc.). In this manner, it is possible to supply a desired voltage to the input capacitor and the power supply circuit portion.

FIG. 1 is a circuit diagram showing a configuration of an overvoltage protection circuit according to a conventional example disclosed in, for example, Non-Patent Document 1. Referring to FIG. 1, the overvoltage protection circuit includes input terminals T1 and T2, a rectifier circuit 102, a control circuit 103, a semiconductor switch 104 made up of, for example, a MOS transistor, and an input capacitor 105. In this case, the overvoltage protection circuit is inserted between an AC power supply 101 and a load 106.

The AC power supply 101 generates an AC voltage, and outputs the AC voltage via the input terminals T1 and T2 and the rectifier circuit 102, to output a full-wave rectified voltage V01 to the load 106. In parallel with the rectifier circuit 102, a series circuit of the semiconductor switch 104 and the input capacitor 105 is connected to the load 106. The control circuit 103 outputs a control voltage V03 to a gate (control terminal) of the semiconductor switch 104 in accordance with the rectified voltage V01 and a drain voltage V02 of the semiconductor switch 104 to control a drain current I01 of the semiconductor switch 104 and controls the switching operation of the semiconductor switch 104.

FIG. 2 is a timing chart showing an operation in the overvoltage protection circuit of FIG. 1 at a timing when the voltage of the AC power supply 101 is lower than a predetermined value and a load voltage V04 does not need to be clamped. Referring to FIG. 2, due to no need for clamping, the control circuit 103 controls the semiconductor switch 104 so as to be always kept in an on-state. Therefore, the voltage V04 is equal to the voltage V01.

FIG. 3 is a timing chart showing an operation in the overvoltage protection circuit of FIG. 1 at a timing when the voltage of the AC power supply 101 is higher than a predetermined value and the load voltage V04 needs to be clamped. Referring to FIG. 3, the control circuit 103 monitors the rectified voltage V01, and turns off the semiconductor switch 104 when the rectified voltage V01 exceeds a predetermined voltage lower than withstand voltages of the input capacitor 105 and the load 106. Therefore, in the case of the high voltage V01 equal to or higher than the predetermined value, the voltage is not applied to the input capacitor 105 or the load 106, and the voltage V04 is controlled so as to be lower than the withstand voltages of the input capacitor 105 and the load 106. Thereafter, the voltage V04 decreases due to the increase in the current of the load 106, and when the voltage V02 becomes zero or becomes sufficiently small, the control circuit 103 turns on the semiconductor switch 104. When the semiconductor switch 104 is turned on with the voltage V01 at a predetermined voltage without following the voltage V02, a large current flows through the semiconductor switch 104 in a state where the drain-source voltage is high, which results in a large loss in the semiconductor switch 104.

In the overvoltage protection circuit configured as described above, even when the AC power supply 101 is a worldwide AC voltage, the withstand voltages of the input capacitor 105 and the load 106 can be lowered to reduce the size of the input capacitor 105. In addition, the parts performance of the load 106 can be improved. Further, due to limitations on the voltage range applied to the load 106, it is possible to facilitate the design of the load 106.

FIG. 4 is a circuit diagram showing the configuration of the control circuit 103 of FIG. 1. Referring to FIG. 4, the control circuit 103 includes voltage dividing resistors 201 and 202, a reference voltage source 203, comparators 204, 205, and a delay type flip-flop (hereinafter, referred to as DFF) 206. The comparator 204 outputs a high-level reset signal to a reset terminal of the DFF 206 when a voltage V21, obtained by the voltage dividing resistors 201 and 202 dividing the rectified voltage V01, exceeds a reference voltage V22 of the reference voltage source 203. The comparator 205 outputs a high-level signal to a clock terminal of the DFF 206 when detecting that the voltage V02 falls below a reference voltage GND. At this time, the DFF 206 outputs the voltage V03. In this case, the DFF 206 outputs a low-level voltage V03 when the voltage V01 exceeds a predetermined voltage, and outputs a high-level voltage V03 after the voltage V02 becomes zero or sufficiently small.

In the conventional example of FIG. 1, it is expected that the steep rise and fall of the current I01 cause deterioration in a conduction disturbing wave voltage. For this reason, a large noise filter is required to pass the regulation on the conduction disturbing wave voltage (for example, CISPR 22 (see Non-Patent Document 2, for example)), and the volume of the power supply apparatus may increase. A steep current fluctuation to the AC power supply 101 causes the conduction disturbing wave voltage, and in order to improve this, it is necessary to suppress the steep current fluctuation to the AC power supply 101.

SUMMARY OF THE INVENTION

An object of the present invention is to provide an overvoltage protection circuit capable of solving the above problems, supplying a desired voltage to a circuit to be protected with suppressing a conduction disturbing wave voltage.

According to one aspect of the present invention, there is provided an overvoltage protection circuit connected between a rectifier circuit that rectifies an AC voltage to output a rectified voltage and a load including an input capacitor element connected to both ends of the load. The overvoltage protection circuit includes: a semiconductor switch connected between the rectifier circuit and the load; and a control circuit that controls the semiconductor switch to be turned on or off. When the rectified voltage exceeds a predetermined value, the control circuit turns off the semiconductor switch, and detects a voltage potential difference between both ends of the semiconductor switch, and then, for an interval when the voltage potential difference is zero or a predetermined minute value, the control circuit generates a control voltage for turning on the semiconductor switch, and outputs the control voltage to a control terminal of the semiconductor switch. The overvoltage protection circuit comprises a current change circuit that gradually changes a current flowing through the semiconductor switch such that a conduction disturbing wave voltage in an output voltage output from the overvoltage protection circuit becomes equal to or lower than a predetermined value at least at one of (A) a timing when the semiconductor switch is turned off and (B) a timing when the semiconductor switch is turned on.

According to the overvoltage protection circuit of the present invention, it is possible to supply a desired voltage to a circuit to be protected and to suppress a conduction disturbing wave voltage.

MODE FOR CARRYING OUT THE INVENTION

Figure 1:
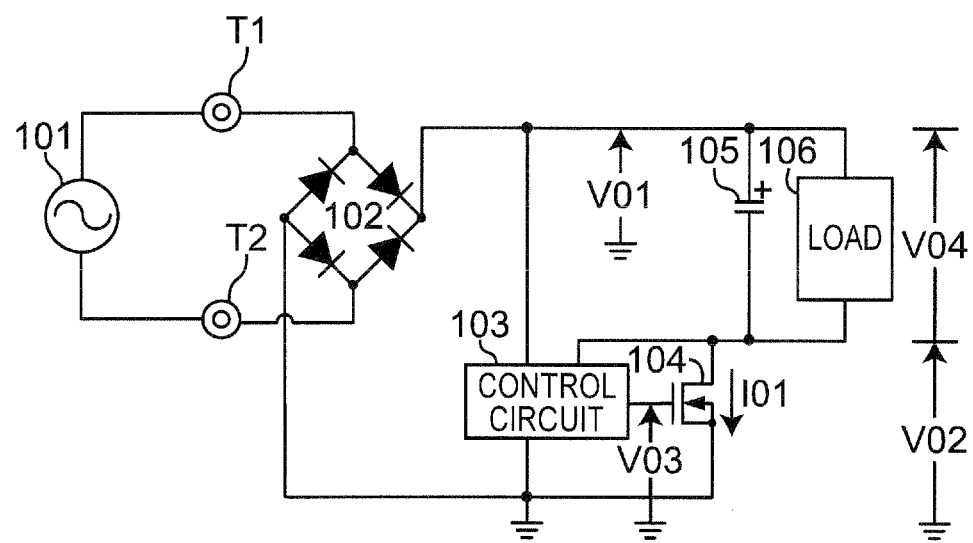
FIG. 1 is a circuit diagram showing a configuration of an overvoltage protection circuit according to a conventional example.
Figure 2:
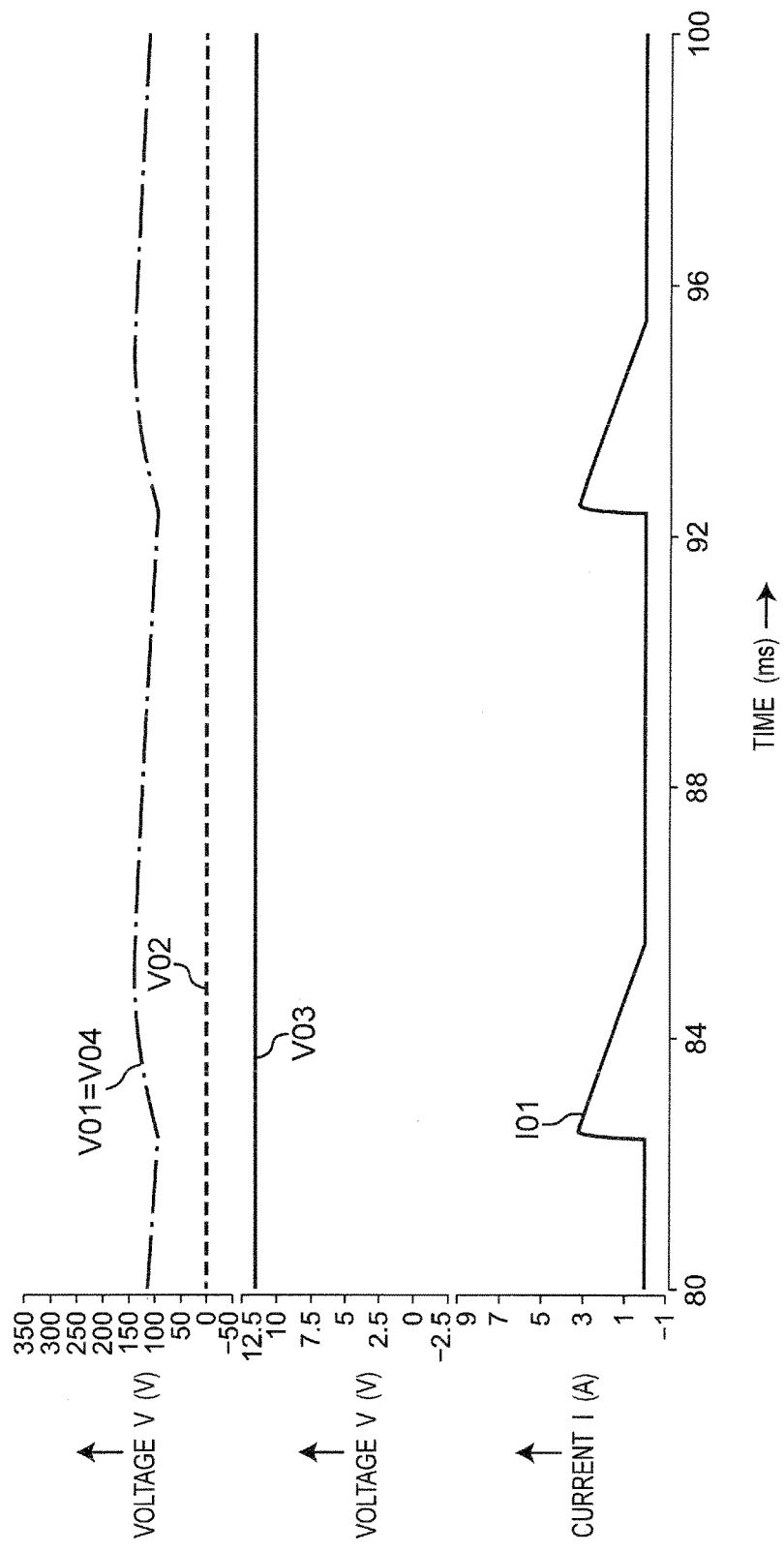
FIG. 2 is a timing chart showing an operation in the overvoltage protection circuit of FIG. 1 at a timing when the voltage of an AC power supply 101 is lower than a predetermined value and a load voltage V04 does not need to be clamped.

Hereinafter, preferred embodiments according to the present invention will be described. In this case, similar constituent elements will be provided with the same reference numerals, and the detailed description thereof will be omitted.

First Preferred Embodiment

Figure 5:
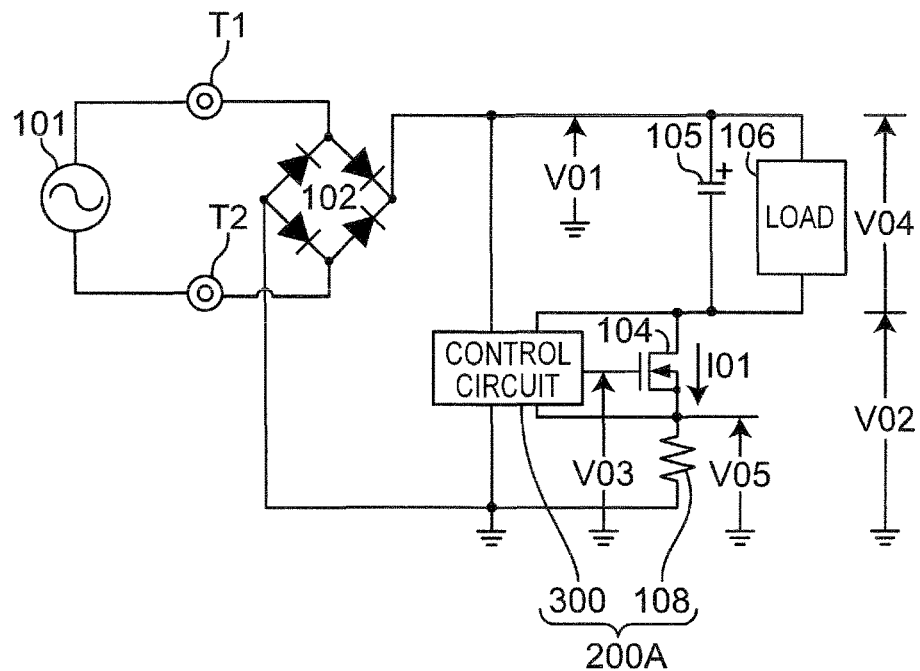
FIG. 5 is a circuit diagram showing a configuration example of an overvoltage protection circuit according to a first preferred embodiment.
Figure 6:
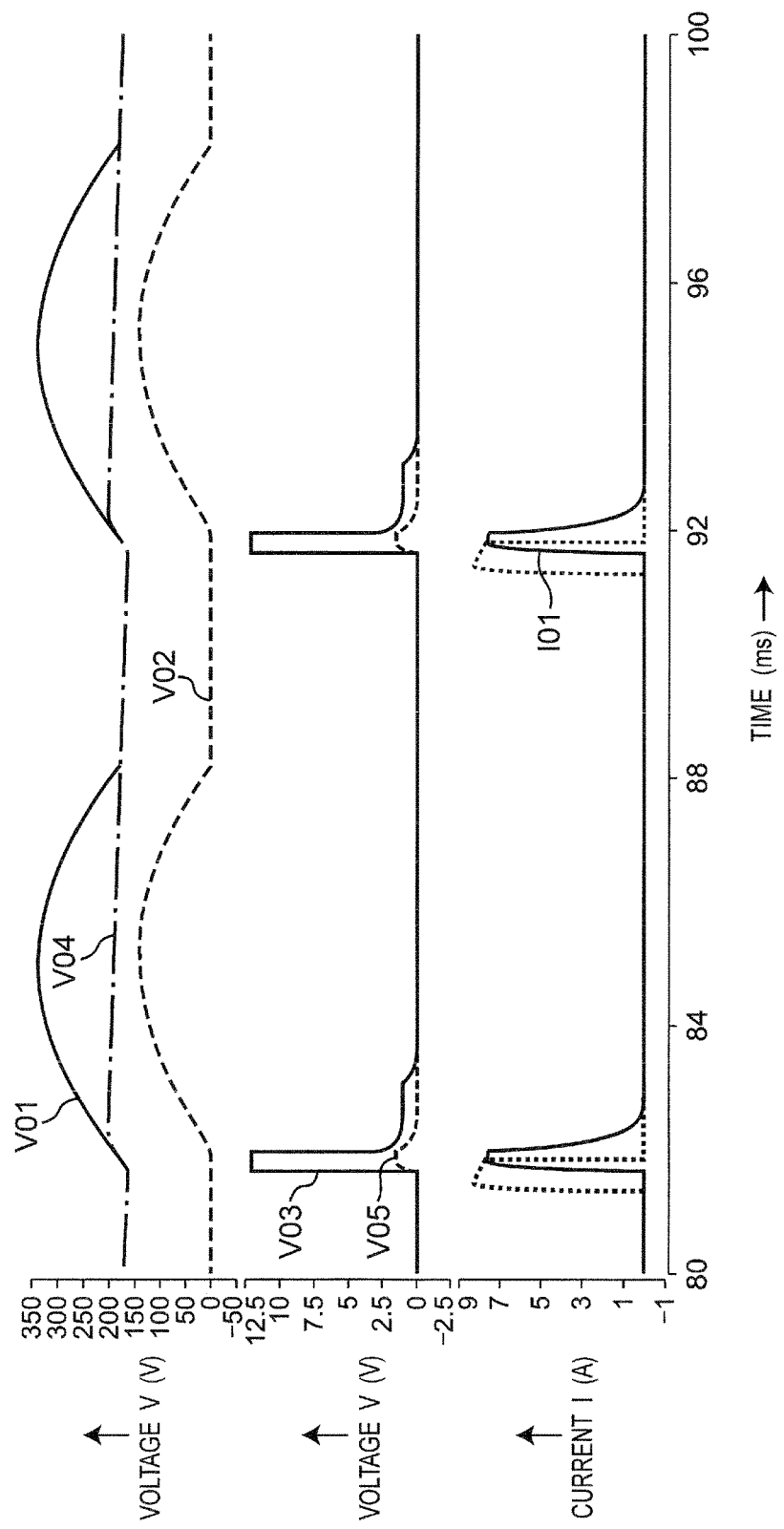
FIG. 6 is a timing chart showing an operation example of the overvoltage protection circuit of FIG. 5.

FIG. 5 is a circuit diagram showing a configuration example of an overvoltage protection circuit according to a first preferred embodiment. In addition, FIG. 6 is a timing chart showing an operation example of the overvoltage protection circuit of FIG. 5. In FIG. 6, a broken line of a current shows a current I01 of FIG. 3 according to the conventional example for the sake of clarifying an operation waveform.

Referring to FIG. 5, the overvoltage protection circuit according to the first preferred embodiment is different as compared with the overvoltage protection circuit according to the conventional example of FIG. 1 at the following points:

(1) in place of a control circuit 103, a control circuit 300 in which a current control function described later is added to the control circuit 103 is provided; and (2) a sense resistor 108 is inserted between a source of a semiconductor switch 104 and a rectifier circuit 102.

The overvoltage protection circuit of FIG. 5 is characterized in that the control circuit 300 and the sense resistor 108 configure a current change circuit 200A that gradually changes the current I01. Hereinafter, the above differences will be described in detail.

Referring to FIG. 5, the control circuit 300 controls a voltage V05 of the sense resistor 108 to equivalently control the current I01. The control circuit 103 according to the conventional example turns on the semiconductor switch 104 when a voltage V02 becomes zero or sufficiently small. In contrast, the control circuit 300 according to the first preferred embodiment turns on the semiconductor switch 104 by detecting an increase in the voltage V02 after the voltage V02 becomes zero or sufficiently small. In this case, the control circuit 300 controls a voltage V05 such that the fluctuation of the current I01 at the on-time or the off-time becomes smooth or gradual.

Figure 7:
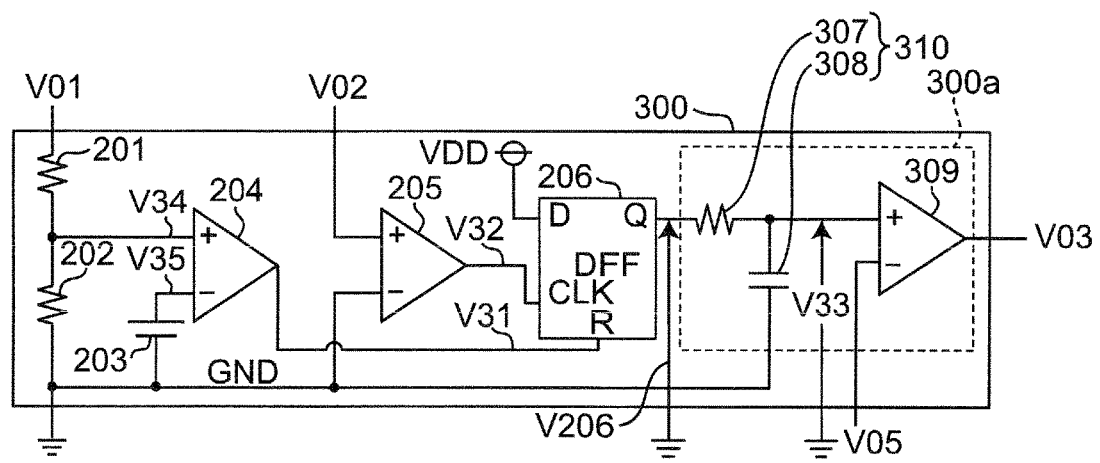
FIG. 7 is a circuit diagram showing a configuration example of a control circuit 300 of FIG. 5.
Figure 8:
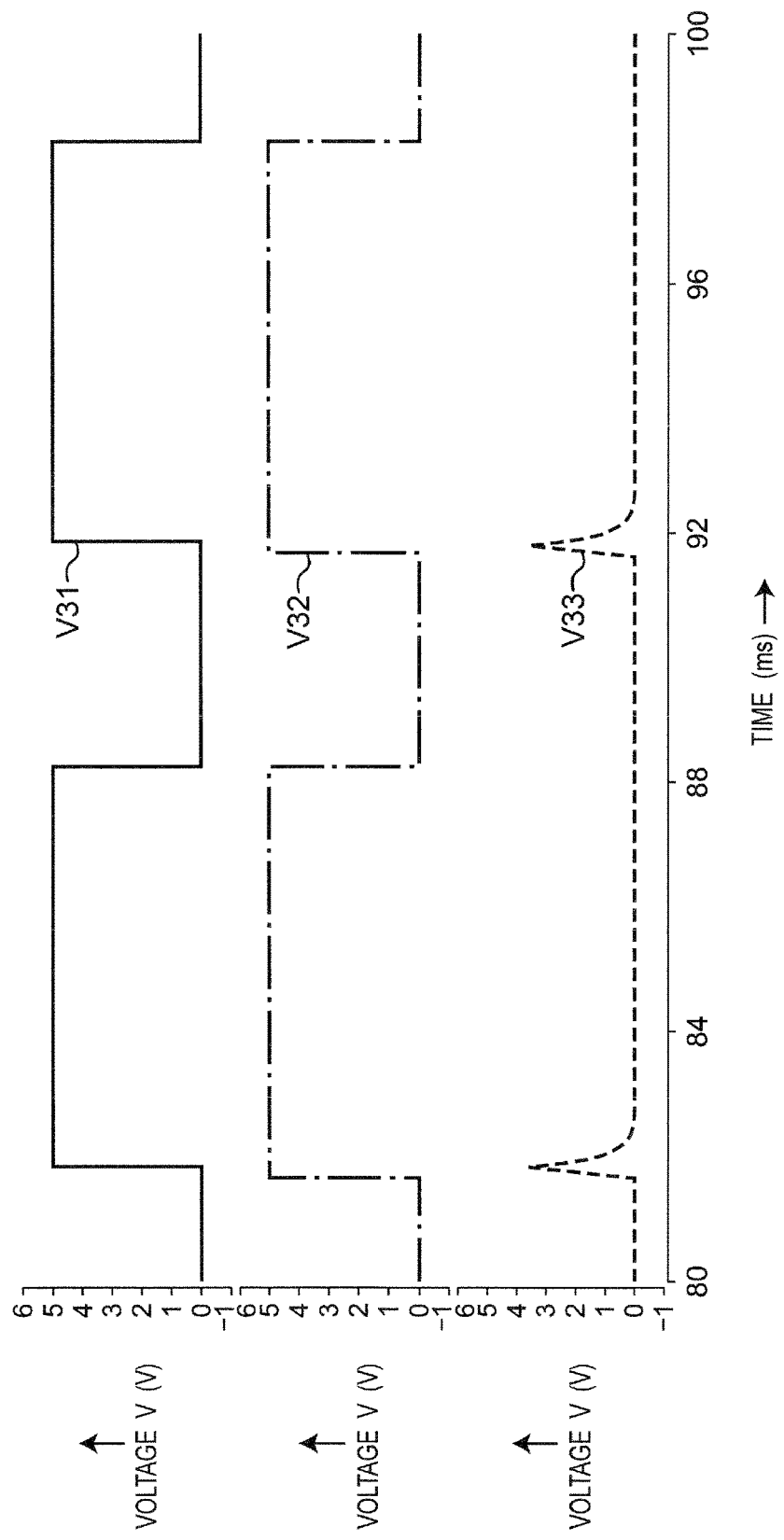
FIG. 8 is a timing chart showing an operation example of the control circuit 300 of FIG. 7.

FIG. 7 is a circuit diagram showing a configuration example of the control circuit 300 of FIG. 5. In addition, FIG. 8 is a timing chart showing an operation example of the control circuit 300 of FIG. 7.

Figure 4:
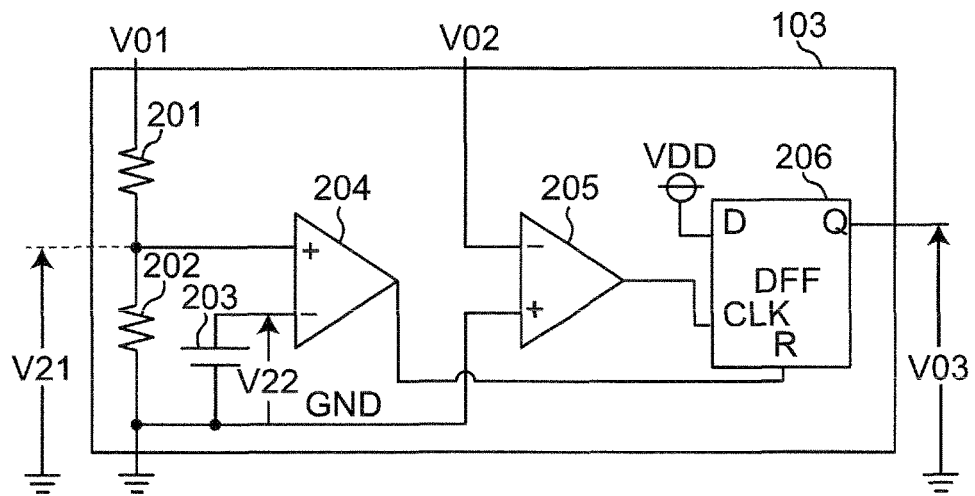
FIG. 4 is a circuit diagram showing a configuration of a control circuit 103 of FIG. 1.

Referring to FIG. 7, it is characterized in that in addition to the constituent elements of the control circuit 103 of FIG. 4, a current control circuit 300a is provided. In this case, the current control circuit 300a includes a resistor 307, a capacitor 308, and a differential amplifier 309.

In the control circuit 300 of FIG. 7, a comparator 204 outputs a high-level reset signal to a reset terminal of a DFF 206 when a voltage V34, obtained by voltage dividing resistors 201 and 202 dividing a rectified voltage V01, exceeds a reference voltage V35 of a reference voltage source 203. A comparator 205 outputs a high-level signal to a clock terminal of the DFF 206 when detecting that the voltage V02 exceeds a reference voltage GND after the voltage V02 has fallen below the reference voltage GND. At this time, the DFF 206 outputs a voltage V206. In this case, the DFF 206 outputs a low-level voltage V206 when the voltage V01 exceeds a predetermined voltage, and outputs a high-level voltage V206 after the voltage V02 becomes zero or sufficiently small.

The output voltage V206 of the DFF 206 is made up of the resistor 307 and the capacitor 308, and is inputted to a non-inverting input terminal of the differential amplifier 309 via a low-pass filter 310 that low-pass filters an input voltage, to become a reference voltage V33 of the differential amplifier 309. In this case, the differential amplifier 309 amplifies a difference voltage between the voltage V05 and the reference voltage V33, and outputs an output voltage V03 which is a differential voltage of the amplification result. In this case, a control system including the differential amplifier 309 controls the output voltage V03 such that the voltage V33 matches the voltage V05.

According to the first embodiment configured as described above, it is possible to suppress a steep fluctuation of the current I01 by using the low-pass filter 310 and to reduce the conduction disturbing wave voltage to a predetermined value or smaller.

In the first embodiment described above, the steep current fluctuation is suppressed using the low-pass filter 310 and the conduction disturbing wave voltage is reduced to a predetermined value or smaller. However, the present invention is not limited to this, and the control circuit 300A or 300B related to the following first and second modified embodiments may be used.

Figure 9:
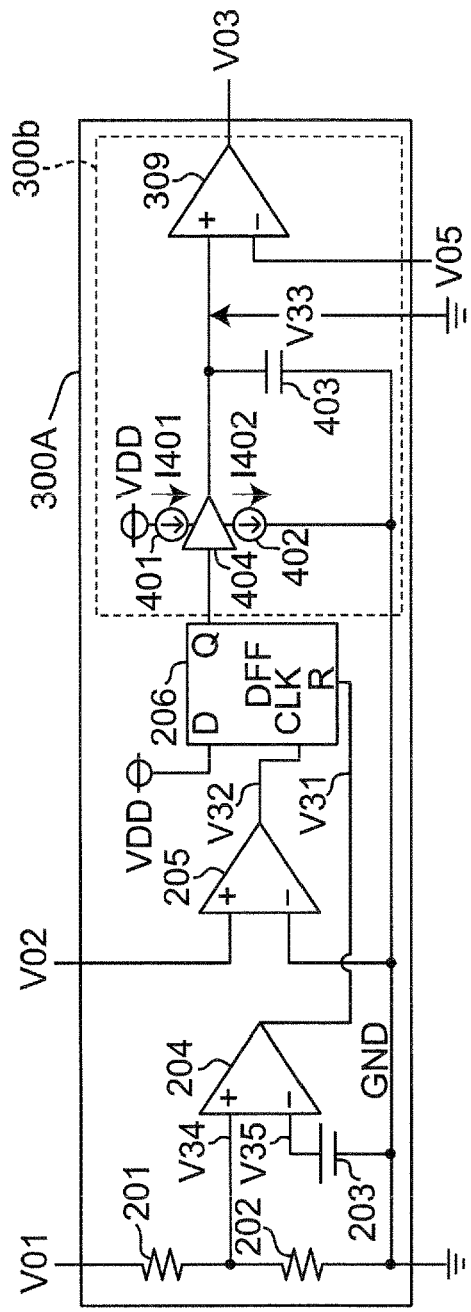
FIG. 9 is a circuit diagram showing a configuration example of a control circuit 300A according to a first modified preferred embodiment.
Figure 10:
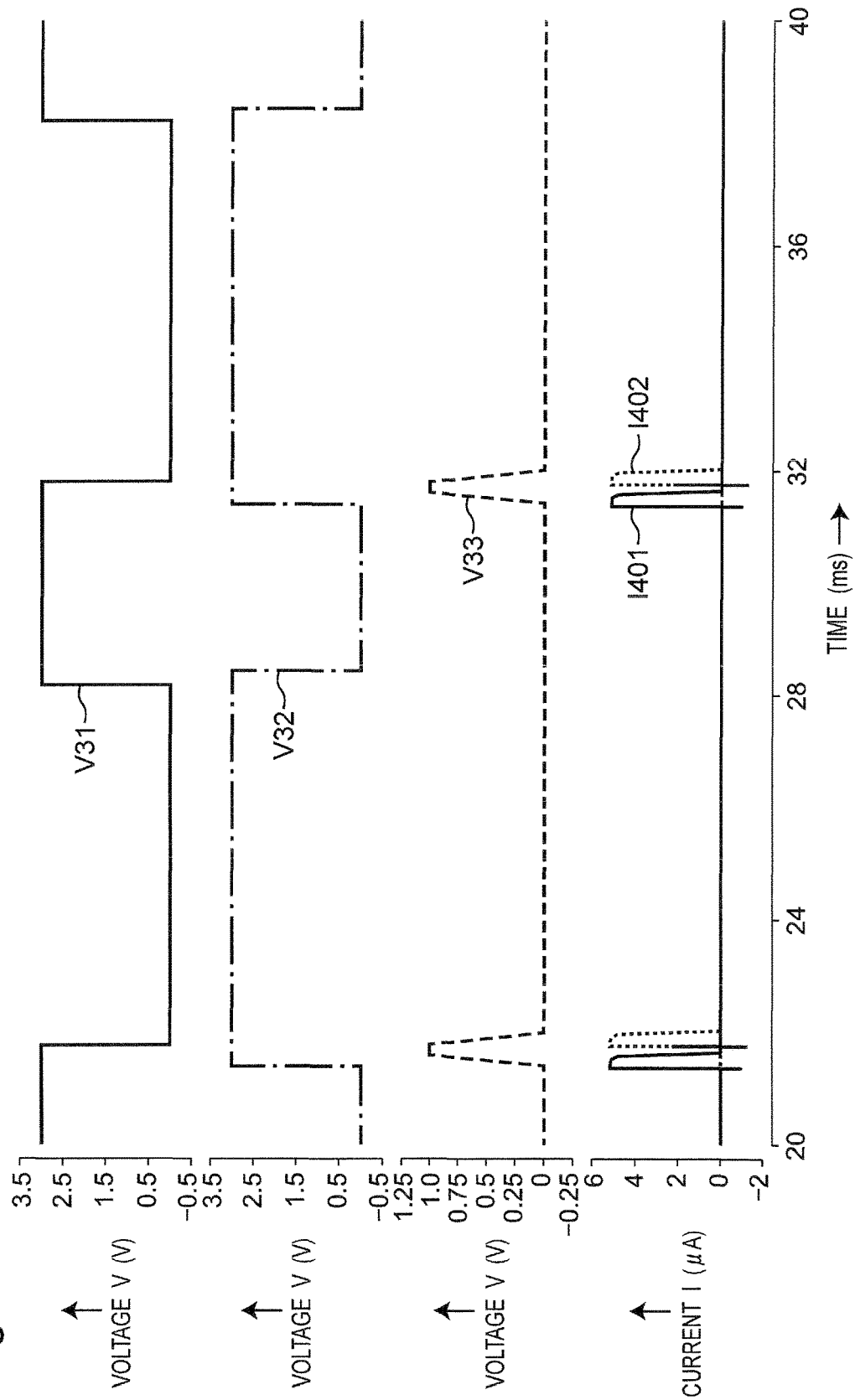
FIG. 10 is a timing chart showing an operation example of the control circuit 300A of FIG. 9.
Figure 11:
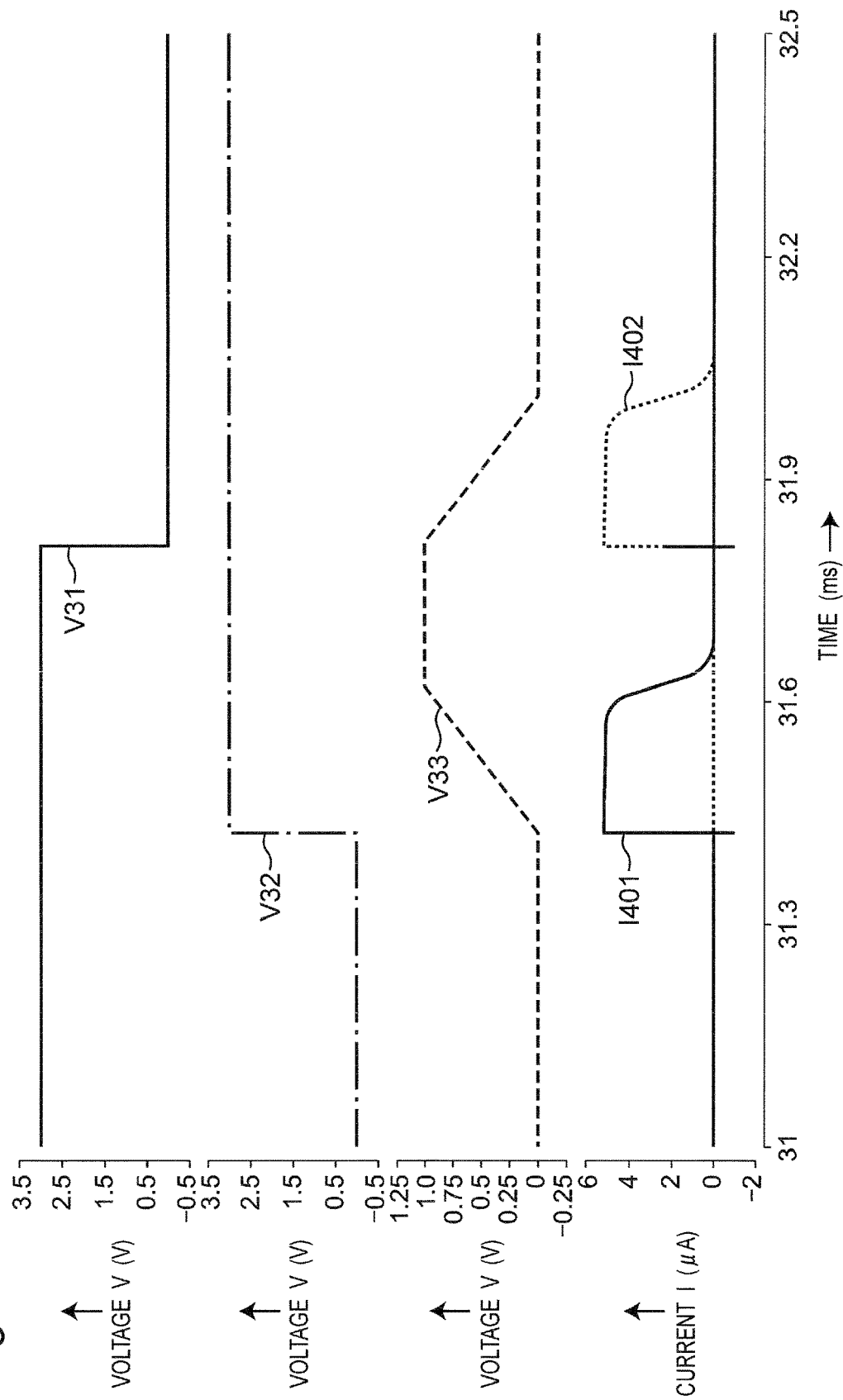
FIG. 11 is an enlarged chart of FIG. 10.

FIG. 9 is a circuit diagram showing a configuration example of the control circuit 300A according to the first modified embodiment. In addition, FIG. 10 is a timing chart showing an operation example of the control circuit 300A of FIG. 9, and FIG. 11 is an enlarged chart of FIG. 10

The control circuit 300A of FIG. 9 is different as compared with the control circuit 300 of FIG. 7 at the following point:

(1) instead of the low-pass filter 310 of FIG. 7, constant current sources 401 and 402, a capacitor 403, and a buffer 404 (performing inversion operation of inverter) are provided. In this case, the constant current sources 401 and 402, the capacitor 403, the buffer 404, and the differential amplifier 309 configure a current control circuit 300b.

Referring to FIG. 9, a positive power supply terminal of the buffer 404 is connected to a power supply voltage VDD via the constant current source 401 through which a constant current I401 flows, and a negative power supply terminal of the buffer 404 is connected to a ground voltage GND via the constant current source 402 through which a constant current I402 flows. The output voltage from the buffer 404 is outputted to the non-inverting input terminal of the differential amplifier 309 via the capacitor 403 connected in parallel with the output of the buffer 404.

In the control circuit 300A of FIG. 9, when the DFF 206 outputs a high-level signal, the constant current I401 flows from the constant current source 401, and a voltage across the capacitor 403 increases linearly. Next, when the DFF 206 outputs a low-level signal, the constant current I402 flows from the constant current source 402, and a voltage across the capacitor 403 decreases linearly with time. In this case, when the current source is made up of a semiconductor IC, a current mirror circuit is usually used, and once the voltage V33 reaches the power supply voltage VDD or the ground voltage GND of the current mirror circuit, no current flows thereafter and the voltage is clamped. In a manner similar to the control circuit 300, the differential amplifier 309 controls and outputs the voltage V03 such that the voltage V33 matches the voltage V05.

Figure 12:
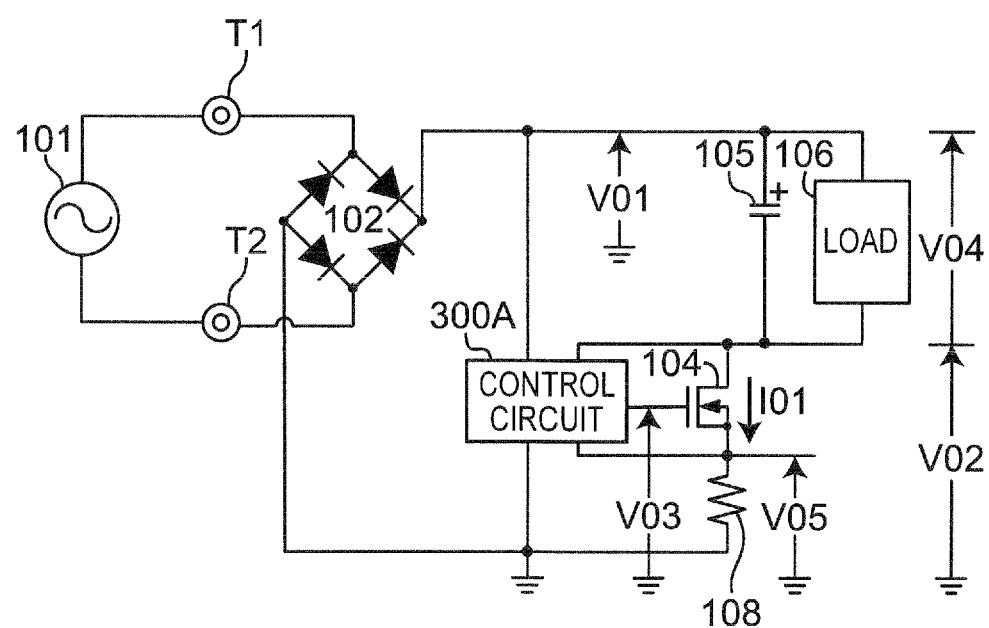
FIG. 12 is a circuit diagram showing a configuration example of an overvoltage protection circuit including the control circuit 300A of FIG. 9.
Figure 13:
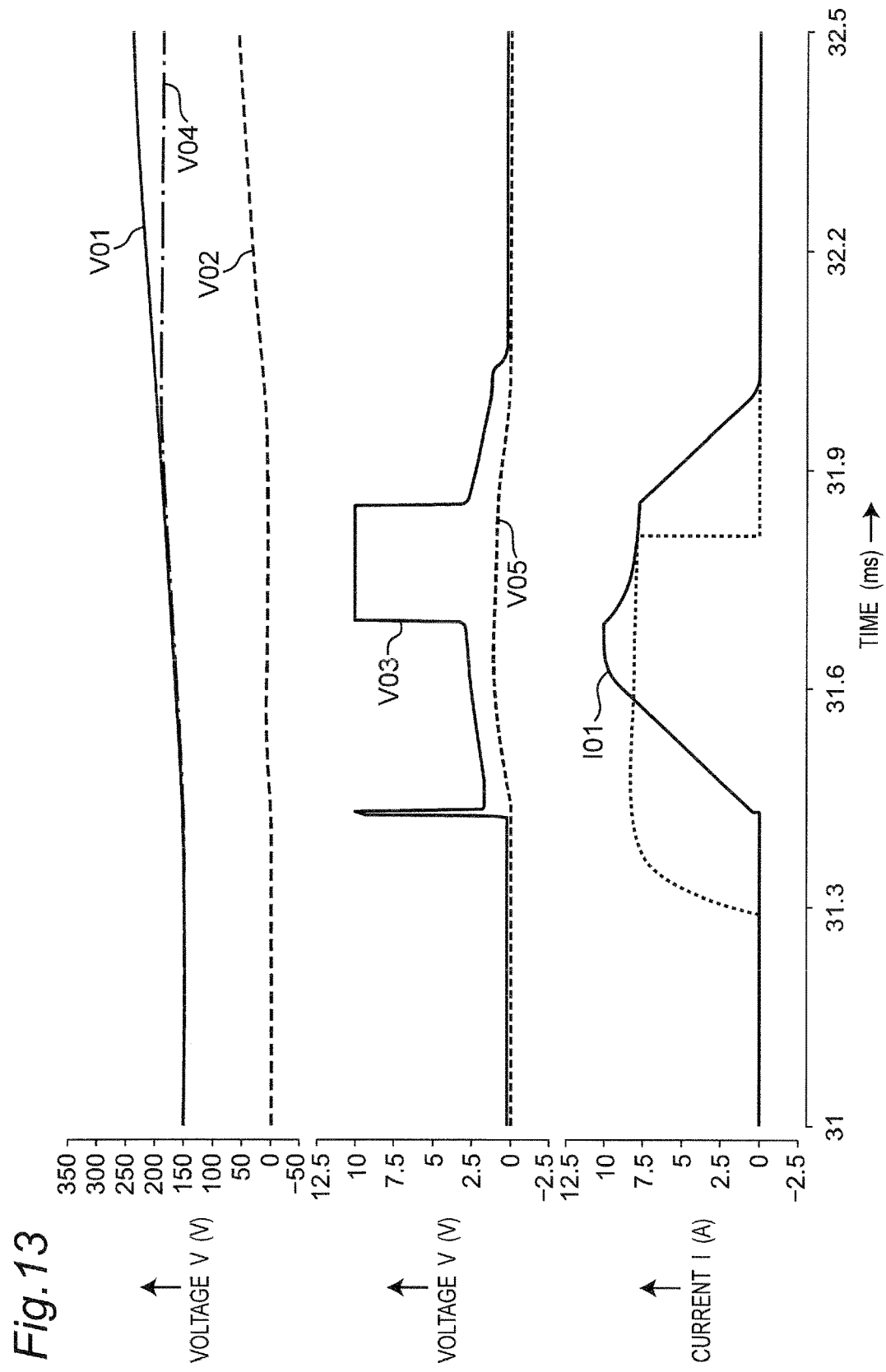
FIG. 13 is a timing chart showing an operation example of the overvoltage protection circuit of FIG. 12.

FIG. 12 is a circuit diagram showing a configuration example of an overvoltage protection circuit including the control circuit 300A of FIG. 9. In addition, FIG. 13 is a timing chart showing an operation example of the overvoltage protection circuit of FIG. 12. In FIG. 13, a broken line of a current indicates 101 of FIG. 3 for the sake of clarity. As is apparent from FIG. 13, it is shown that the control circuit 300A can suppress a steep current fluctuation.

Figure 14:
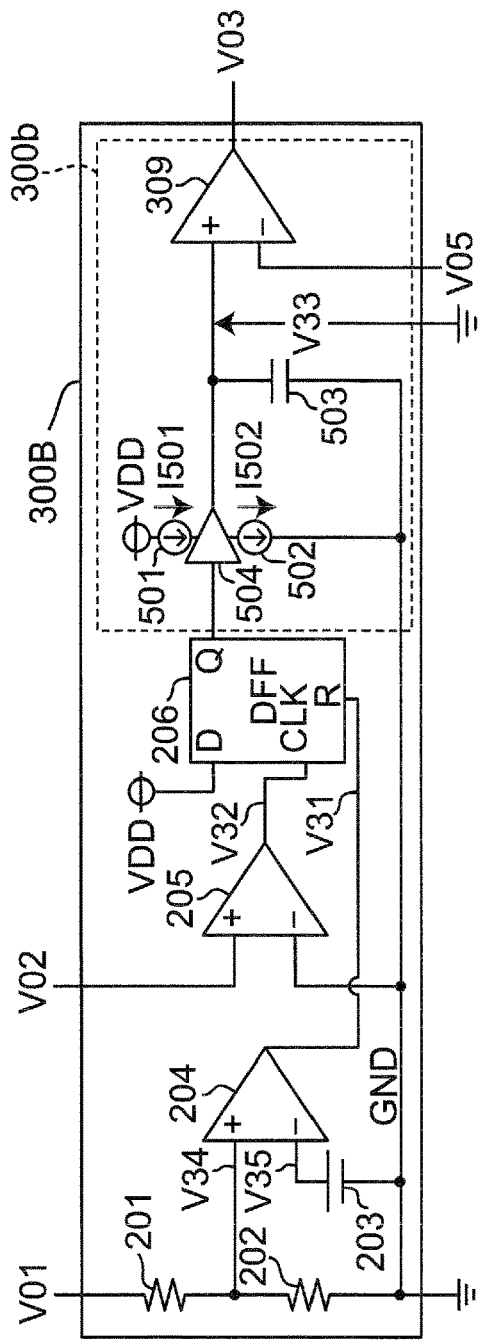
FIG. 14 is a circuit diagram showing a configuration example of a control circuit 300B according to a second modified preferred embodiment.
Figure 15:
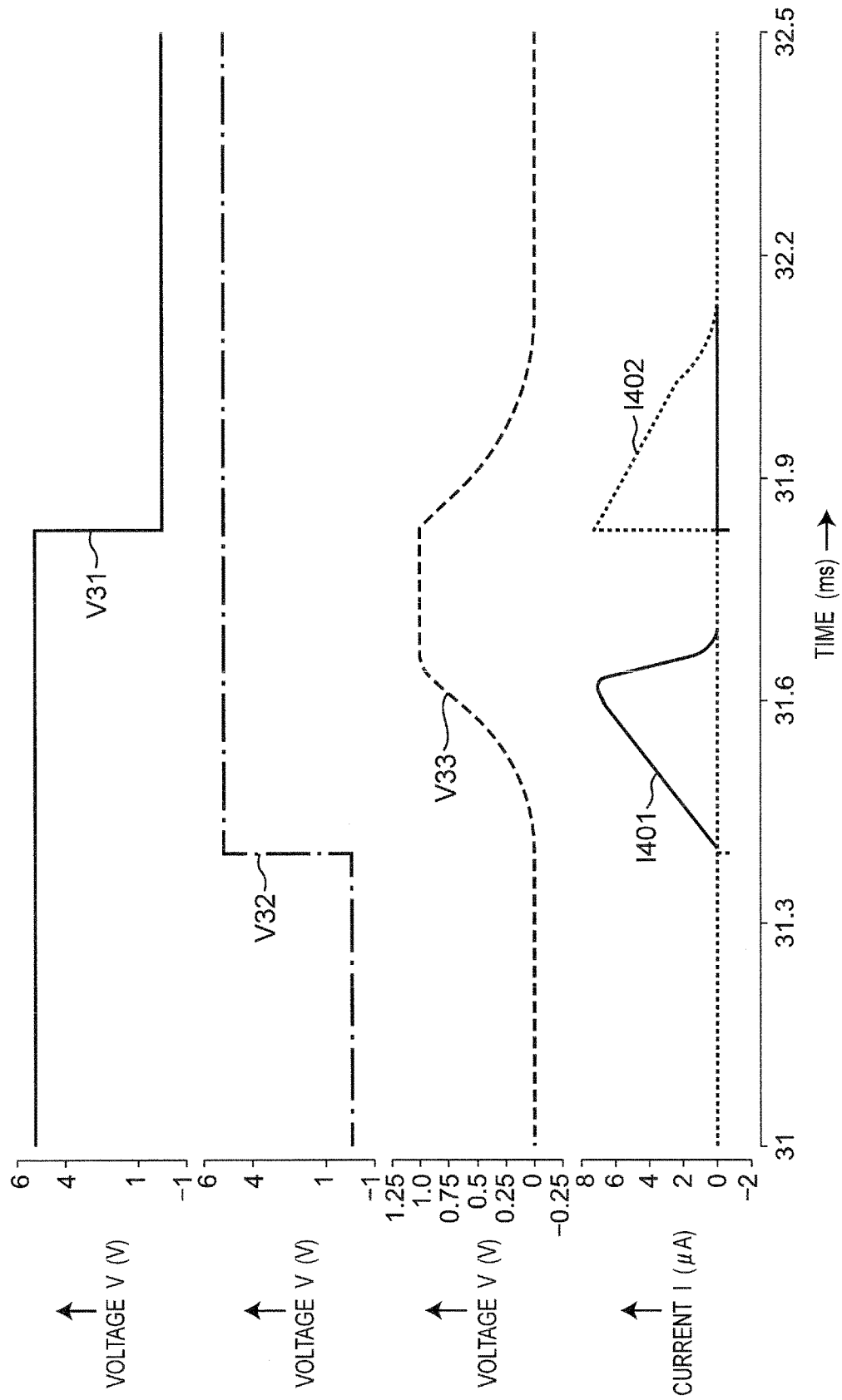
FIG. 15 is a timing chart showing an operation example of the control circuit 300B of FIG. 14.

FIG. 14 is a circuit diagram showing a configuration example of the control circuit 300B according to the second modified embodiment. In addition, FIG. 15 is a timing chart showing an operation example of the control circuit 300B of FIG. 14.

The control circuit 300l3 of FIG. 14 is different as compared with the control circuit 300 of FIG. 7 in the following point:

(1) instead of the low-pass filter 310 of FIG. 7, sawtooth wave current sources 501 and 502, a capacitor 503, and a buffer (inverted inverter) 504 are provided. In this case, the sawtooth wave current sources 501 and 502, the capacitor 503, the buffer 504, and the differential amplifier 309 configure the current control circuit 300b.

Referring to FIG. 14, a positive power supply terminal of the buffer 504 is connected to the power supply voltage VDD via the sawtooth wave current source (triangular wave current source) 501 through which a sawtooth current (or triangular wave current) 1501 flows. In addition, a negative power supply terminal of the buffer 504 is connected to the ground voltage GND via the sawtooth wave current source 502 through which a sawtooth current (or triangular wave current) 1502 flows. The output voltage from the buffer 504 is outputted to the non-inverting input terminal of the differential amplifier 309 via the capacitor 503 connected in parallel with the output of the buffer 504.

In the control circuit 300B of FIG. 14, when the DFF 206 outputs a high-level signal, a sawtooth current 1501 flows from the sawtooth wave current source 501, and the voltage across the capacitor 503 increases nonlinearly with time. Next, when the DFF 206 outputs a low-level signal, a sawtooth current 1502 flows from the sawtooth wave current source 502, and a voltage across the capacitor 503 nonlinearly decreases as the time lapses with the decrease in the charge amount when the current source is made up of a semiconductor IC, a current mirror circuit is usually used, and once the voltage V33 reaches the power supply voltage VDD or the ground voltage GND of the current mirror circuit, no current flows thereafter and the voltage is clamped. In a manner similar to the control circuit 300, the differential amplifier 309 controls the output voltage V03 such that the voltage V33 matches the voltage V05.

Figure 16:
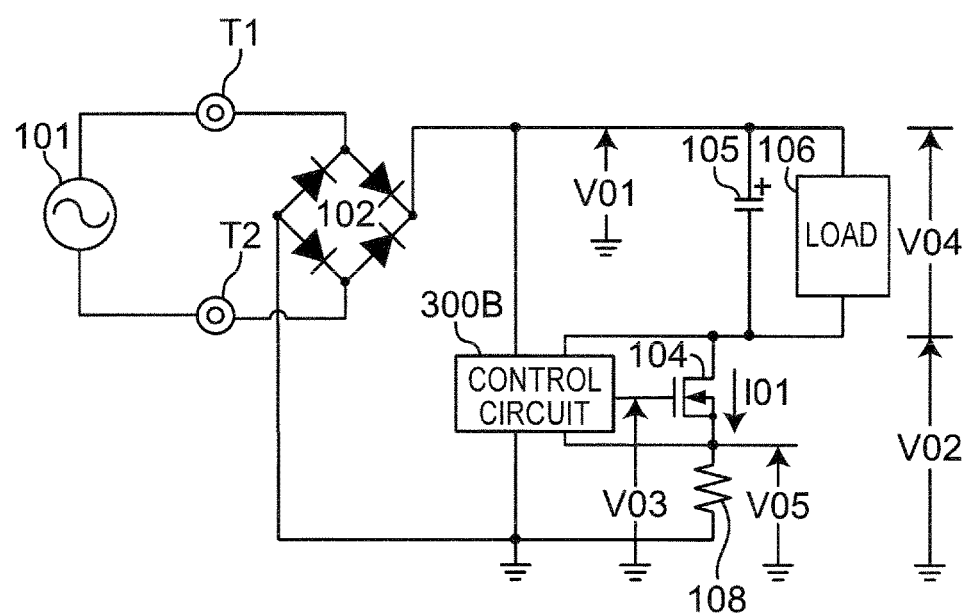
FIG. 16 is a circuit diagram showing a configuration example of an overvoltage protection circuit including the control circuit 300B of FIG. 14.
Figure 17:
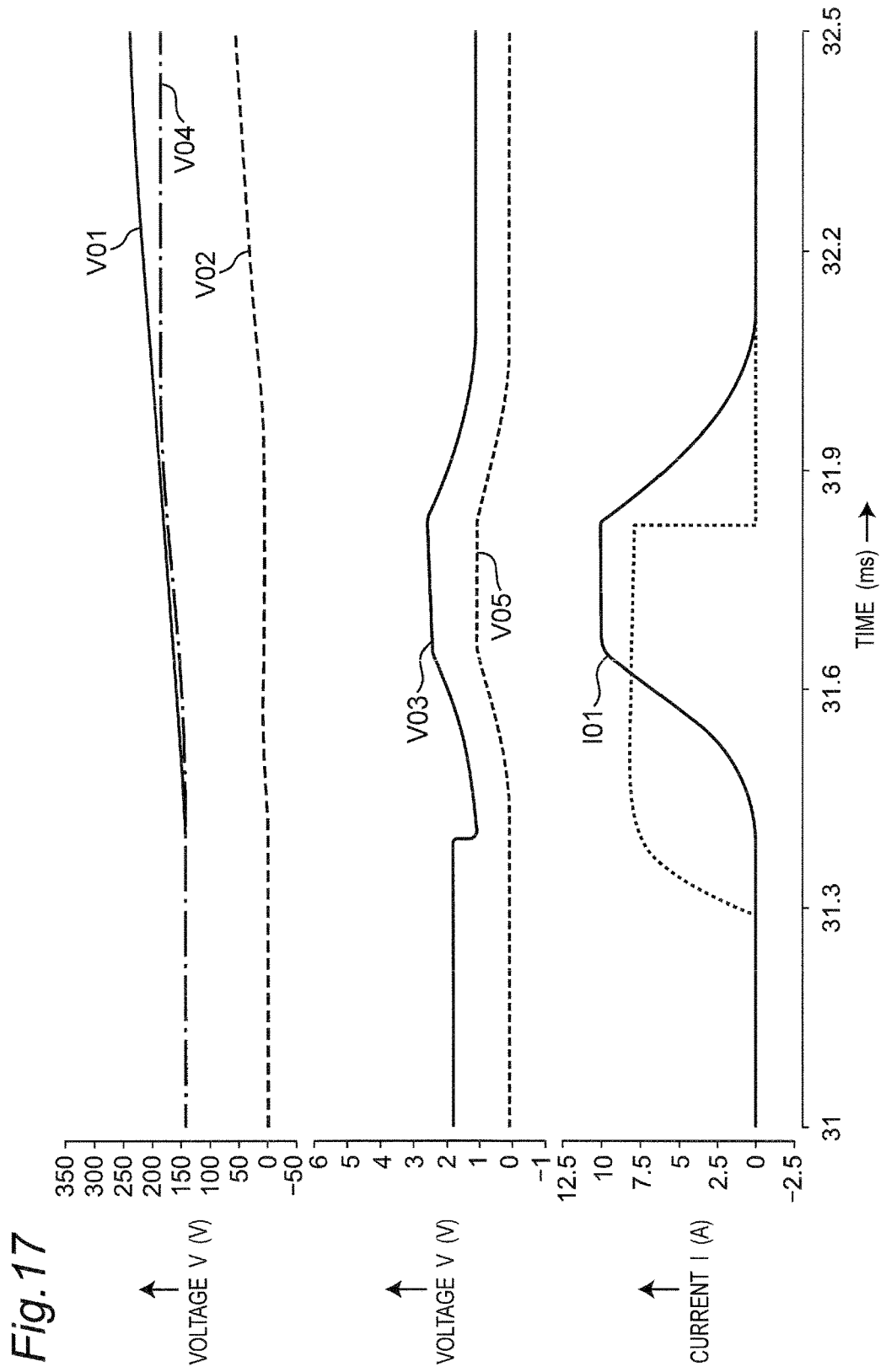
FIG. 17 is a timing chart showing an operation example of the overvoltage protection circuit of FIG. 16.

FIG. 16 is a circuit diagram showing a configuration example of an overvoltage protection circuit including the control circuit 300B of FIG. 14. In addition, FIG. 17 is a timing chart showing an operation example of the overvoltage protection circuit of FIG. 16. Referring to FIG. 17, a broken line of a current indicates 101 of FIG. 3 for the sake of clarity. As is apparent from FIG. 17, it is shown that the control circuit 300B can suppress a steep current fluctuation. In addition, when the control circuit 300B is used, the voltage V05 can be fluctuated nonlinearly as shown of FIG. 17 by sawtooth current control, so that it is possible to change the fluctuation of the current I01 gradually as compared with the case of using the control circuit 300A under constant current control.

Figure 18:
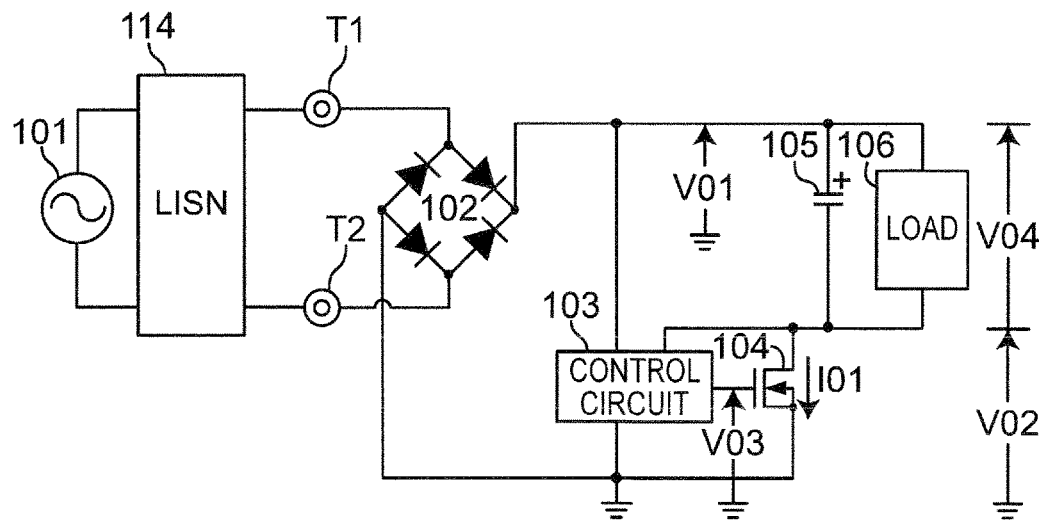
FIG. 18 is a circuit diagram showing a configuration of a simulation circuit including the overvoltage protection circuit of FIG. 1.
Figure 19:
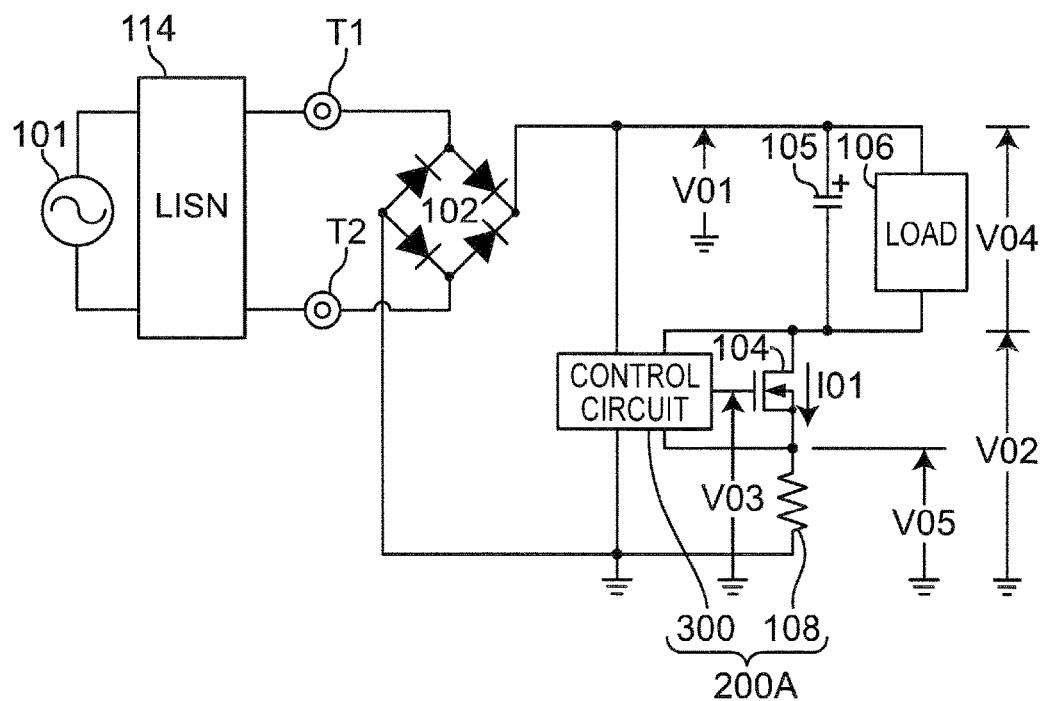
FIG. 19 is a circuit diagram showing a configuration of a simulation circuit including the overvoltage protection circuit of FIG. 5.
Figure 20:
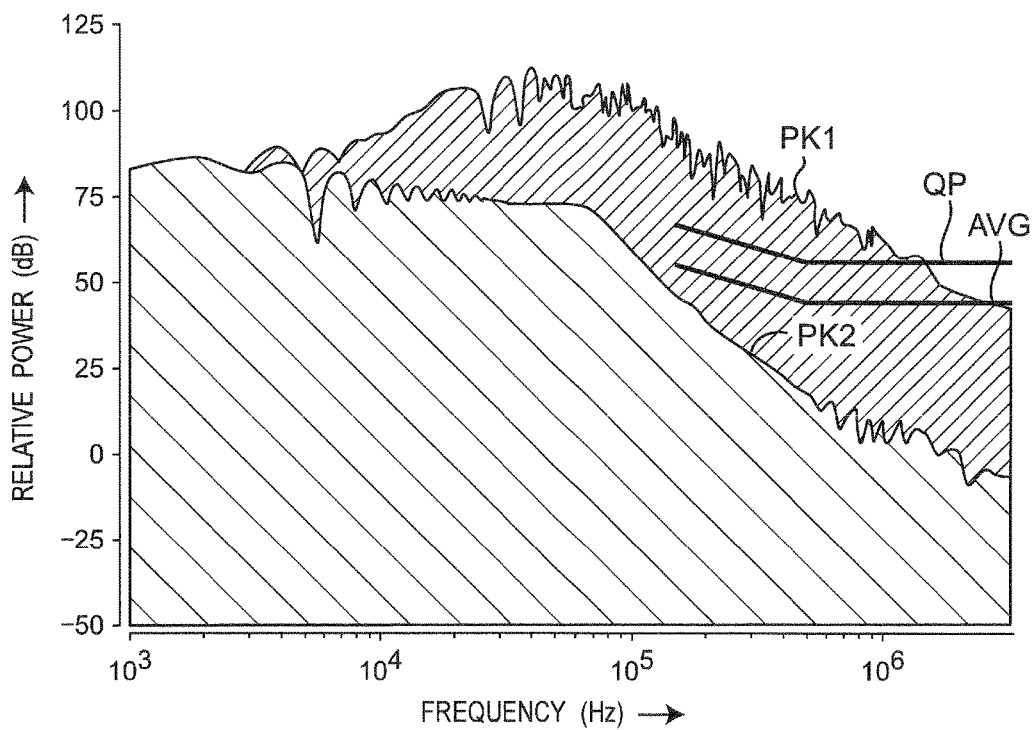
FIG. 20 is a graph showing frequency characteristics of output relative power which are simulation results of the simulation circuit of FIGS. 18 and 19.

FIG. 18 is a circuit diagram showing a configuration of a simulation circuit including the overvoltage protection circuit of FIG. 1. In addition, FIG. 19 is a circuit diagram showing a configuration of a simulation circuit including the overvoltage protection circuit of FIG. 5. Further, FIG. 20 is a graph showing frequency characteristics of output relative power which are simulation results of the simulation circuit of FIGS. 18 and 19. In the graph showing the frequency characteristics of the relative power of FIG. 20 and the like, display of a slight change in the relative power is omitted for convenience to draw attention to large power.

As shown in FIG. 18, a pseudo power supply network or an artificial mains network (hereinafter, referred to as LISN; LISN is an abbreviation for Line Impedance Stabilization Network) 114 for measuring the conduction disturbing wave voltage is added between the AC power supply 101 and the rectifier circuit 102 of FIG. 1 to construct a simulation circuit. In addition, as shown in FIG. 19, a LISN 114 is added between the AC power supply 101 and the rectifier circuit 102 of FIG. 5 to construct a simulation circuit. FIG. 20 shows the simulation results of a peak value PK1 of the conduction disturbing wave voltage of FIG. 18 and a peak value PK2 of the conduction disturbing wave voltage of FIG. 19. In FIG. 20, for reference, a standard limit value QP of a quasi-peak value in a conduction disturbing wave CLASS B of CISPR 22 (see Non-Patent Document 2, the same hereinafter) and a standard limit value AVG of an average value are additionally described.

As is apparent from FIG. 6, in the simulation circuit of FIG. 18, the current fluctuations at the on-time and the off-time are steep, whereas in the simulation circuit of FIG. 19, the current fluctuations at the on-time and the off-time are smooth. Hence it is possible to confirm that the peak value PK2 of the conduction disturbing wave voltage is lower than the peak value PK1 of the conduction disturbing wave voltage.

As described above, according to the first embodiment or the modified embodiments thereof, the current change circuit 200A of the low-pass filter 310, the control circuit 300A including the current control circuit 300a, or the control circuit 300B including the current control circuit 300b is used to suppress the steep fluctuation of the current I01. In addition, it is possible to reduce the conduction disturbing wave voltage to a predetermined value or smaller.

Second Embodiment

Figure 21:
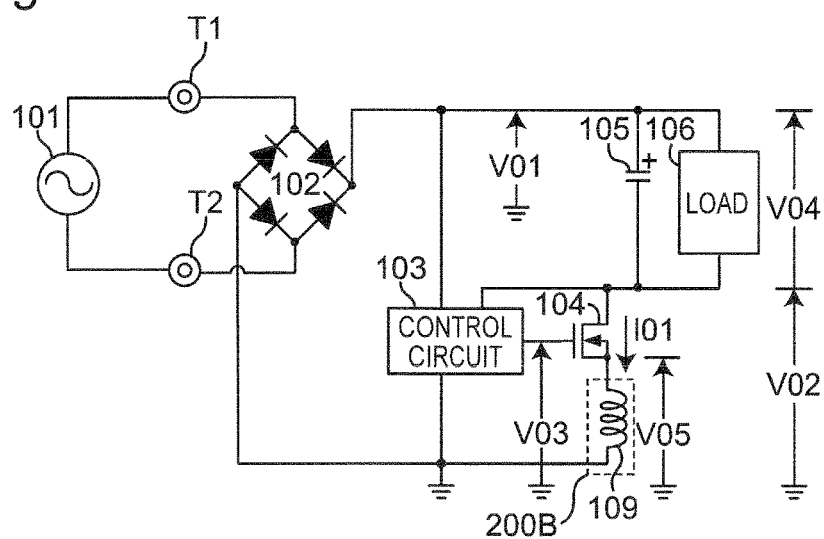
FIG. 21 is a circuit diagram showing a configuration example of an overvoltage protection circuit according to a second preferred embodiment.
Figure 22:
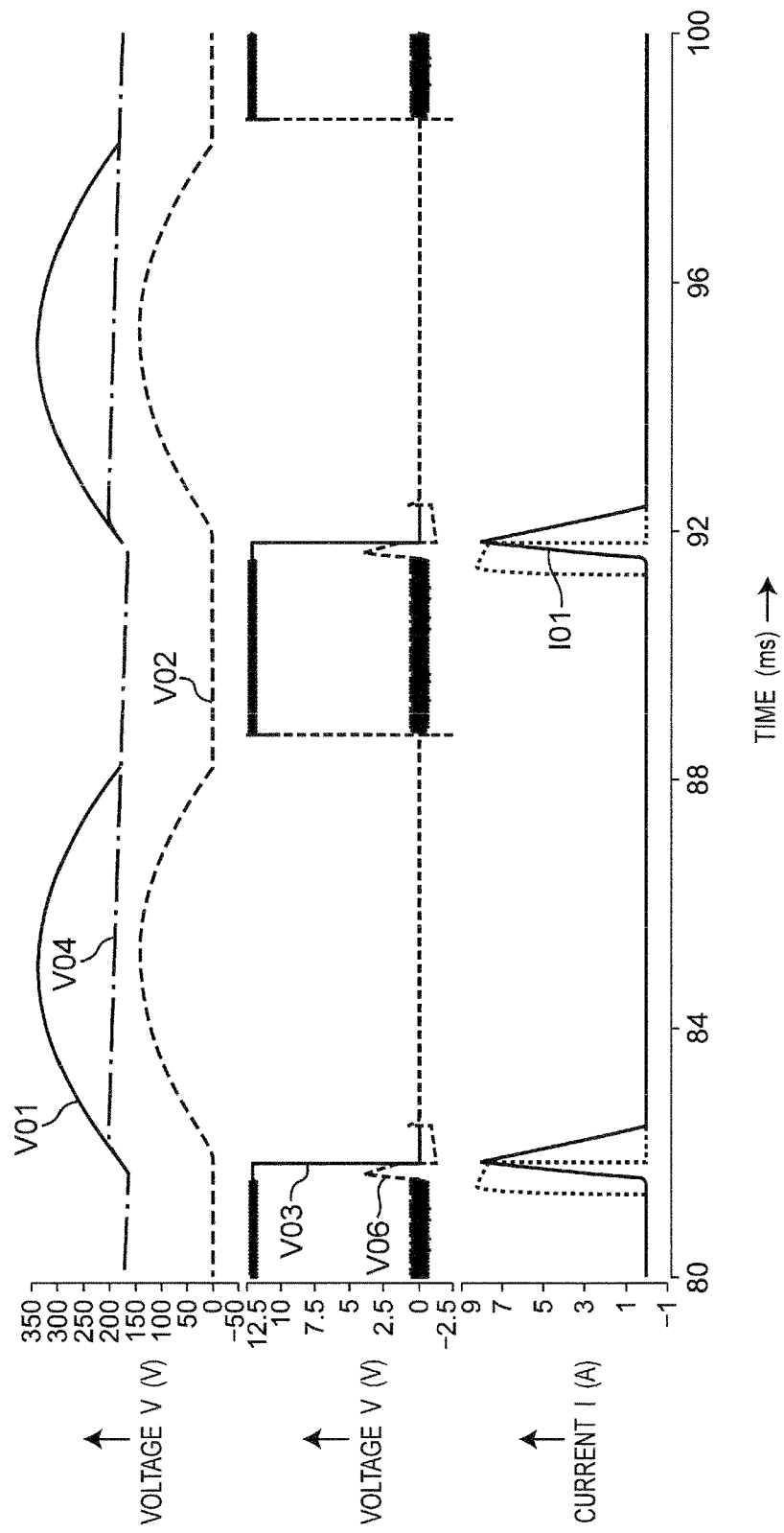
FIG. 22 is a timing chart showing an operation example of the overvoltage protection circuit of FIG. 21.

FIG. 21 is a circuit diagram showing a configuration example of an overvoltage protection circuit according to a second embodiment. In addition, FIG. 22 is a timing chart showing an operation example of the overvoltage protection circuit of FIG. 21. Referring to FIG. 21, the overvoltage protection circuit according to the second embodiment is different as compared with the overvoltage protection circuit of FIG. 1 in the following point:

(1) a current change circuit 200B including an inductor 109 is inserted between a source of a semiconductor switch 104 and a ground voltage GND.

Figure 3:
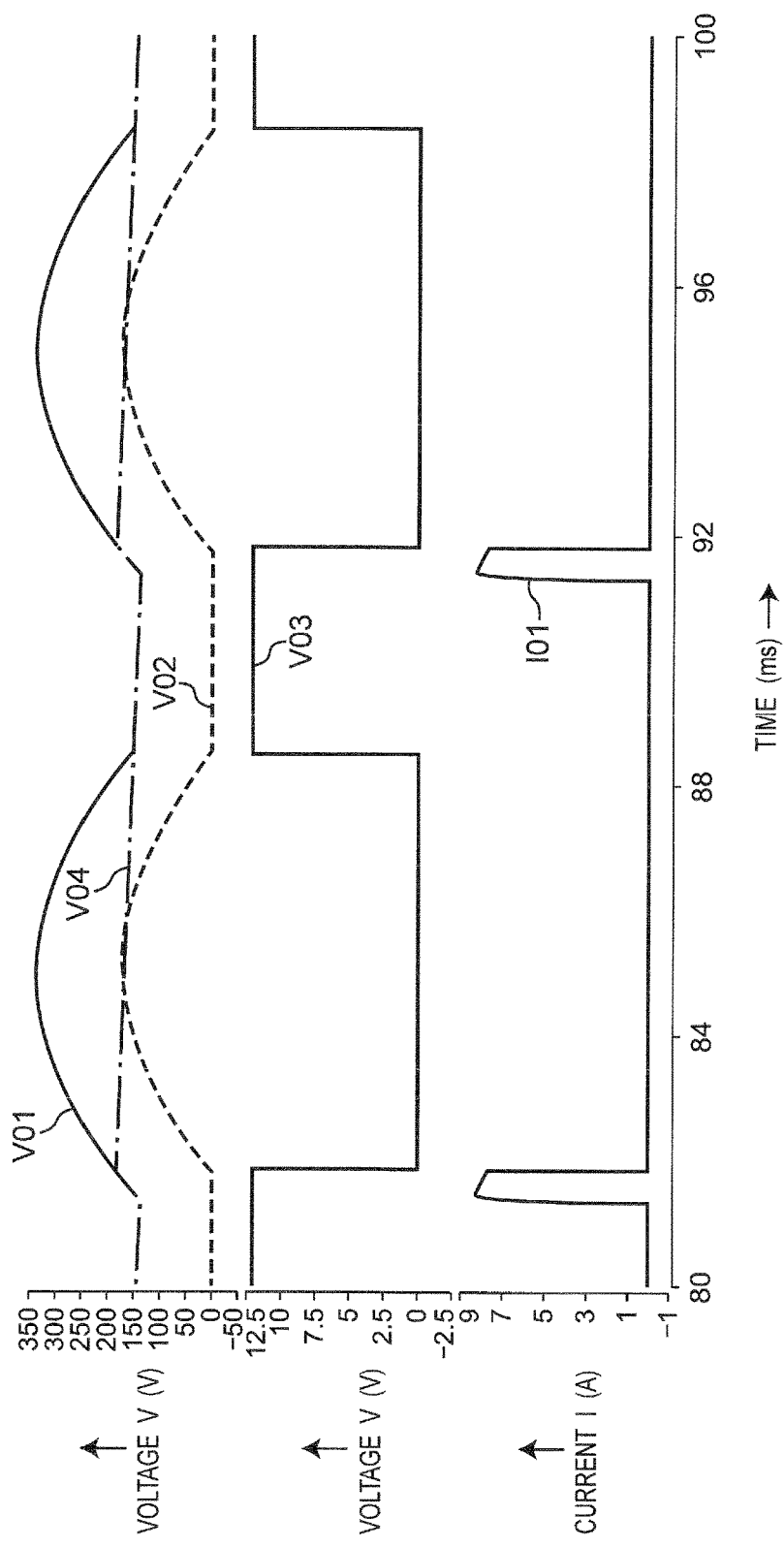
FIG. 3 is a timing chart showing an operation in the overvoltage protection circuit of FIG. 1 at a timing when the voltage of the AC power supply 101 is higher than a predetermined value and the load voltage V04 needs to be clamped.

In FIG. 22, a broken line of a current shows a current I01 of FIG. 3 for the sake of clarity. In the first embodiment of FIG. 5, the control circuit 300 controls the current with the sense resistor 108 so as to suppress a steep current fluctuation. However, an increase in loss by the sense resistor 108 and an increase in loss of the semiconductor switch 104 during current control generate. In order to solve this problem, in the second embodiment of FIG. 21, the inductor 109 is inserted into the source of the semiconductor switch 104 to suppress a steep current fluctuation. Ideally, no loss generates in the inductor 109, and complicated current control is unnecessary for a control circuit 103.

Figure 23:
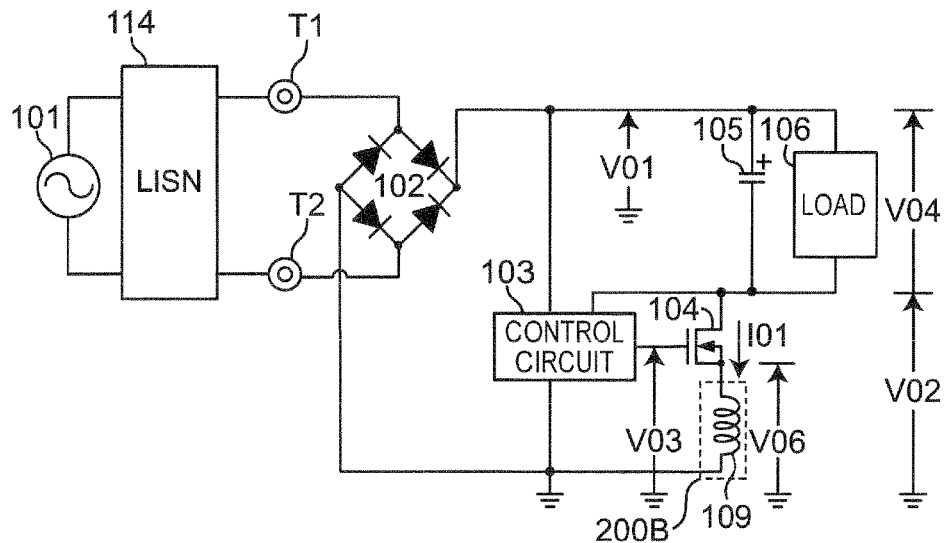
FIG. 23 is a circuit diagram showing a configuration of a simulation circuit including the overvoltage protection circuit of FIG. 21.
Figure 24:
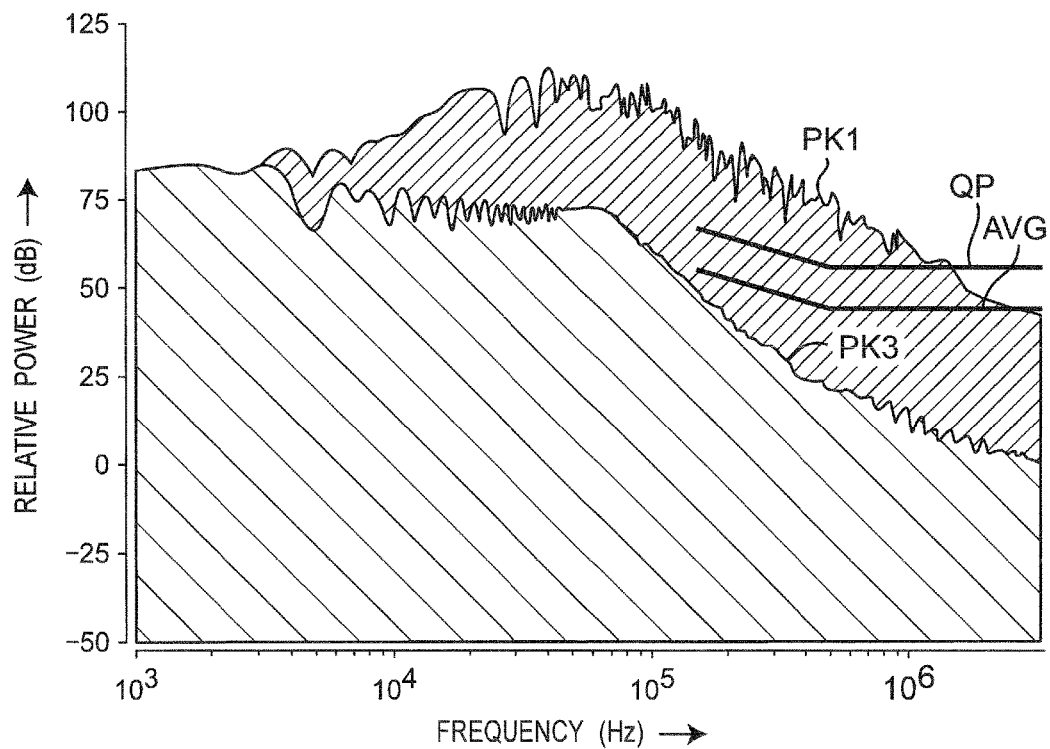
FIG. 24 is a graph showing a frequency characteristic of output relative power which is a simulation result of the simulation circuit of FIG. 23.

FIG. 23 is a circuit diagram showing a configuration of a simulation circuit including the overvoltage protection circuit of FIG. 21. In addition, FIG. 24 is a graph showing a frequency characteristic of output relative power which is a simulation result of the simulation circuit of FIG. 23. In FIG. 23, a LISN 114 is added between an AC power supply 101 and a rectifier circuit 102 of FIG. 20 to configure a simulation circuit. FIG. 24 shows simulation results of the peak value PK1 and a peak value PK3 of a conduction disturbing wave voltage of FIG. 23. Referring to FIG. 24, for reference, a standard limit value QP of a quasi-peak value in a conduction disturbing wave CLASS B of the CISPR 22 and a standard limit value AVG of an average value are additionally described.

As is apparent from FIG. 22, in the circuit of FIG. 18, the current fluctuations at the on-time and the off-time are steep, whereas in the circuit of FIG. 23, the current fluctuations at the on-time and the off-time are smooth. Hence it is possible to confirm that the peak value PK3 is lower than the peak value PK1.

As described above, according to the second embodiment, it is possible to suppress the steep fluctuation of the current I01 by using the current change circuit 200B including the inductor 109 and to reduce the conduction disturbing wave voltage to a predetermined value or smaller.

Third Embodiment

Figure 25:
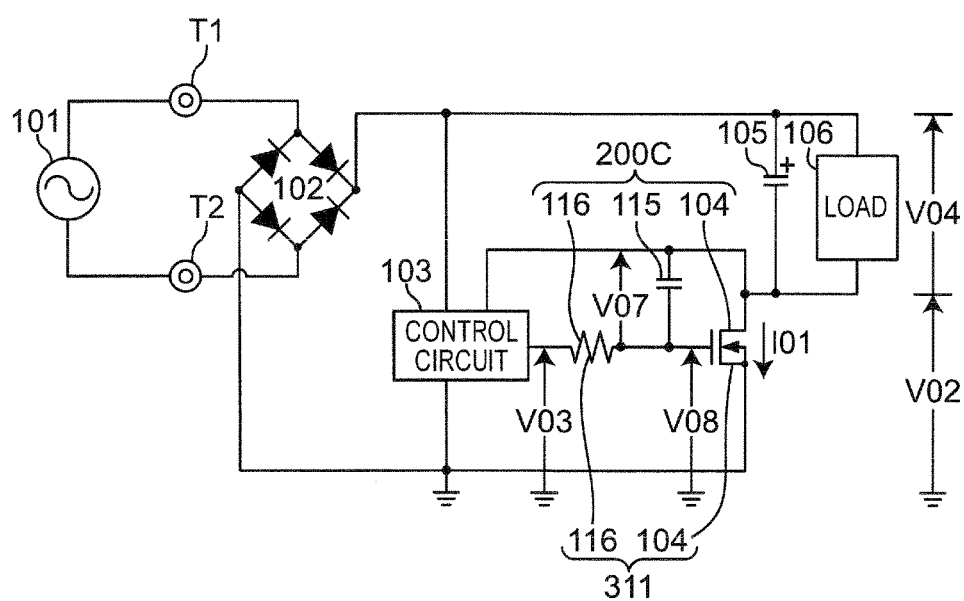
FIG. 25 is a circuit diagram showing a configuration example of an overvoltage protection circuit according to a third preferred embodiment.
Figure 26:
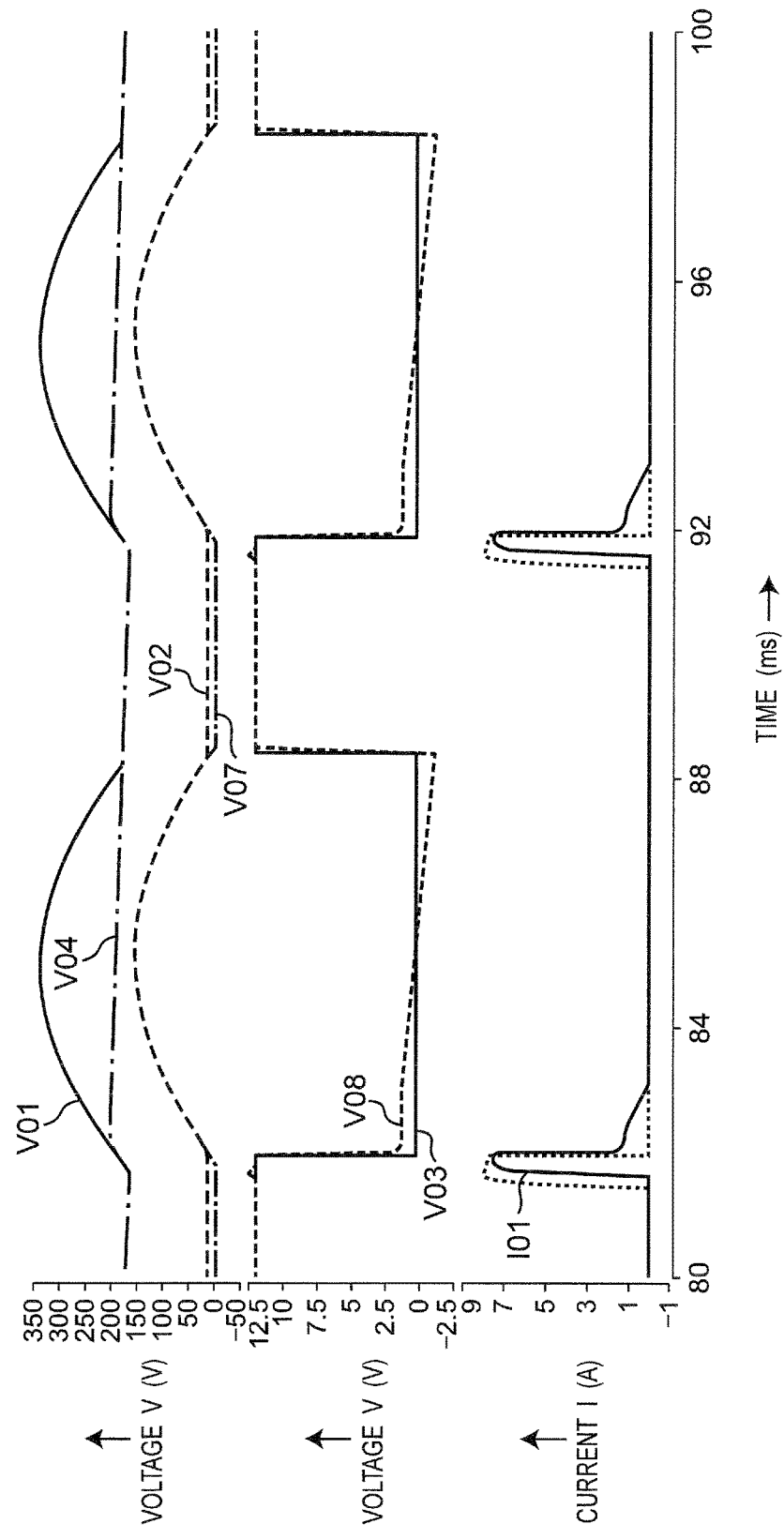
FIG. 26 is a timing chart showing an operation example of the overvoltage protection circuit of FIG. 25.

FIG. 25 is a circuit diagram showing a configuration example of an overvoltage protection circuit according to a third embodiment. In addition, FIG. 26 is a timing chart showing an operation example of the overvoltage protection circuit of FIG. 25. Referring to FIG. 25, the overvoltage protection circuit according to the third embodiment is different as compared with the overvoltage protection circuit of FIG. 1 in the following point:

(1) a capacitor 115 being a feedback capacitor is connected between a drain and a gate of a semiconductor switch 104, and a resistor 116 is connected between an output terminal of a control circuit 103 and a gate of the semiconductor switch 104.

Hereinafter, the above differences will be described in detail.

Referring to FIG. 25, a voltage V07 is the drain-gate voltage of the semiconductor switch 104, and a voltage V08 is the gate-source voltage of the semiconductor switch 104. In FIG. 26, a broken line of a current shows the current I01 of FIG. 3 for the sake of clarity.

Referring to FIG. 25, a low-pass filter 311 made up of the resistor 116 and a gate capacitor of the semiconductor switch 104 and the capacitor 115 being the feedback capacitor for feeding back a fluctuation of a voltage V02 to the voltage V08 suppress a current fluctuation when the semiconductor switch 104 is off. This configures a current change circuit 200C that gradually changes the current I01.

As described above, according to the third embodiment, with the current change circuit 200C provided, it is possible to gradually change the fluctuation of the current I01 as compared with the conventional example and to lower the conduction disturbing wave voltage to a predetermined value or smaller.

As apparent from FIG. 26, the voltage V02 is a positive slope when the semiconductor switch 104 is off, and hence the fluctuation of the voltage V08 becomes more gradual due to the coupling of the capacitor 115, to enhance the effect of the low-pass filter 311. Since the fluctuation of the voltage V08 can be set by the time constant of the capacitor 115 and the resistor 116, it is possible to facilitate adjustment of the current waveform when the semiconductor switch 104 is off. In addition, complicated current control is unnecessary for the control circuit 103, which simplifies the circuit configuration as compared as the time when the control circuit 300 is provided. Note that the resistor 116 may be configured inside the control circuit 103.

Figure 27:
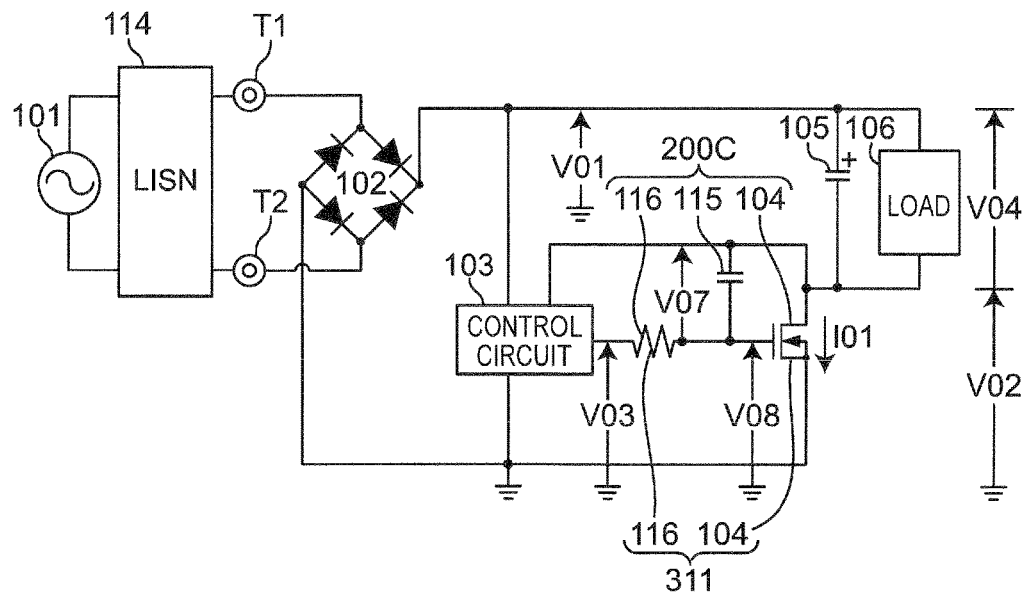
FIG. 27 is a circuit diagram showing a configuration of a simulation circuit including the overvoltage protection circuit of FIG. 25.
Figure 28:
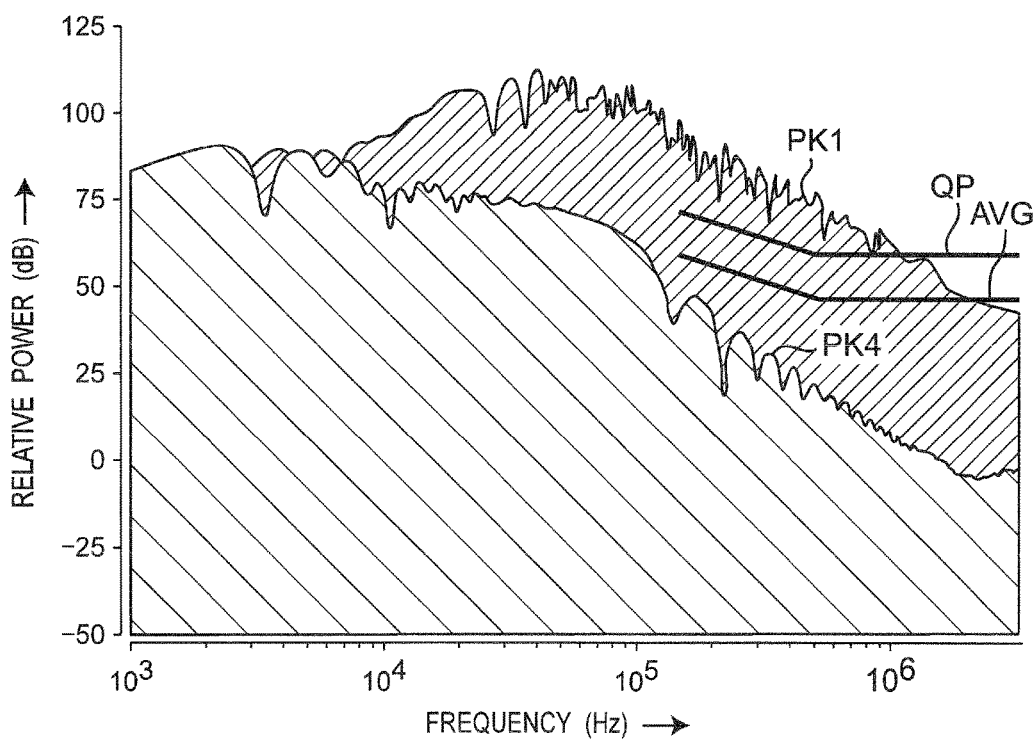
FIG. 28 is a graph showing a frequency characteristic of output relative power which is a simulation result of the simulation circuit of FIG. 27.

FIG. 27 is a circuit diagram showing a configuration of a simulation circuit including the overvoltage protection circuit of FIG. 25. In addition, FIG. 28 is a graph showing a frequency characteristic of output relative power which is a simulation result of the simulation circuit of FIG. 27

As shown in FIG. 27, a LISN 114 is added between an AC power supply 101 and a rectifier circuit 102 of FIG. 25 to configure a simulation circuit. FIG. 28 shows simulation results of the peak value PK1 and a peak value PK4 of the conduction disturbing wave voltage of FIG. 27. Referring to FIG. 28, for reference, a standard limit value QP of a quasi-peak value in a conduction disturbing wave CLASS B of a CISPR 22 and a standard limit value AVG of an average value are additionally described.

As is apparent from FIG. 26, in the circuit of FIG. 25, the current fluctuation is steep when the semiconductor switch 104 is off, whereas in the circuit of FIG. 27, the current fluctuation is smooth when the semiconductor switch 104 is off. Hence it is possible to confirm that the peak value PK4 is lower than the peak value PK1.

In the case of application of the overvoltage protection circuit, even when the input voltage becomes a high voltage equal to or higher than a predetermined value, a desired voltage can be supplied to the input capacitor 105 and the load 106 such as a power supply circuit portion by clamping the input voltage.

However, on the other hand, since the power is supplied to the input capacitor 105 only during the time when the semiconductor switch 104 is on, a conduction angle is narrow as compared with the time when a low voltage equal to or lower than the desired voltage is input, and hence a current flowing through the input capacitor 105 and the semiconductor switch 104 is relatively large. The loss of the semiconductor switch 104 at the on-time is calculated as the square of the current, and there has thus been a problem of an increase in the loss of the semiconductor switch 104. In order to solve this problem, protection circuits according to fourth and fifth embodiments described below are proposed.

Fourth Embodiment

Figure 29A:
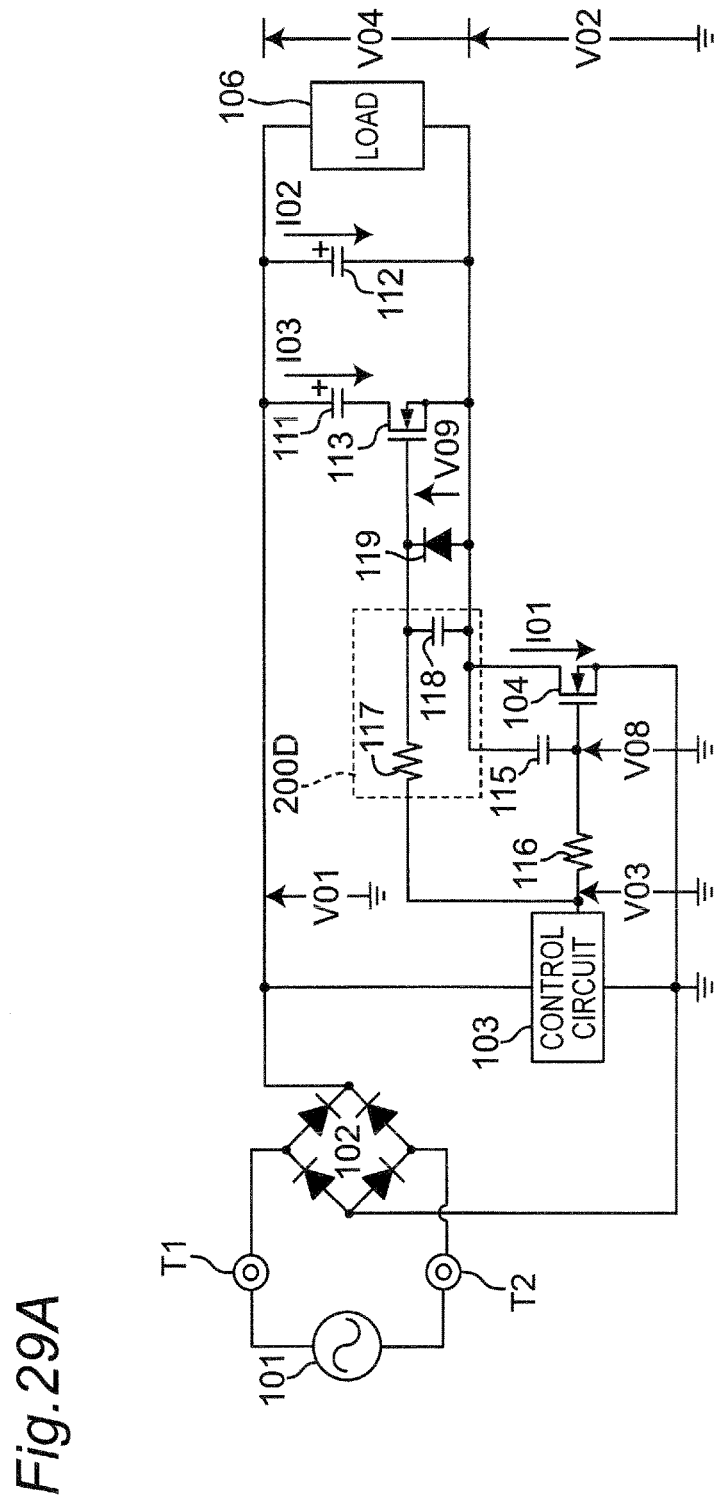
FIG. 29A is a circuit diagram showing a configuration example of an overvoltage protection circuit according to a fourth preferred embodiment.
Figure 30:
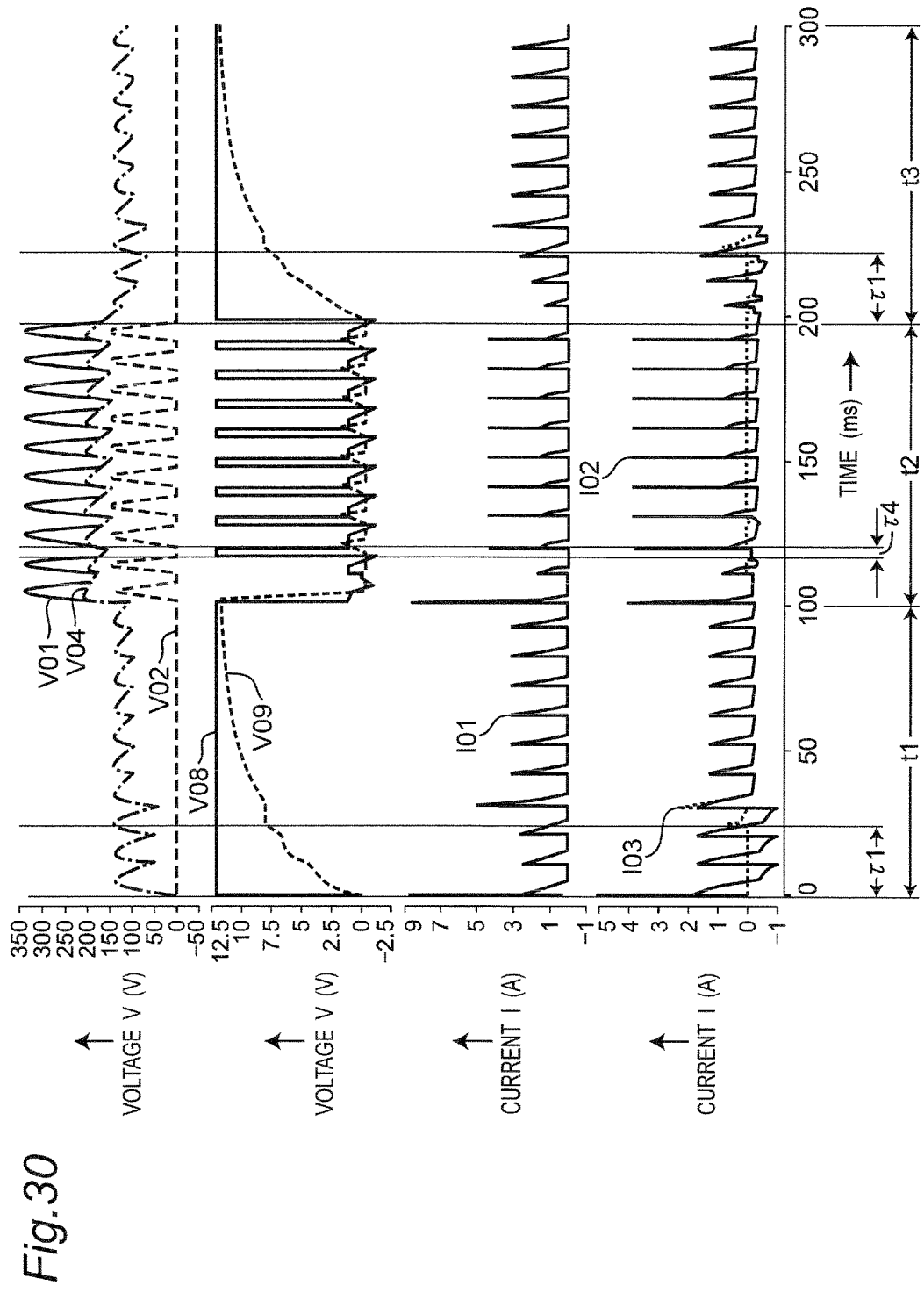
FIG. 30 is a timing chart showing an operation example of the overvoltage protection circuit of FIG. 29A.
Figure 31:
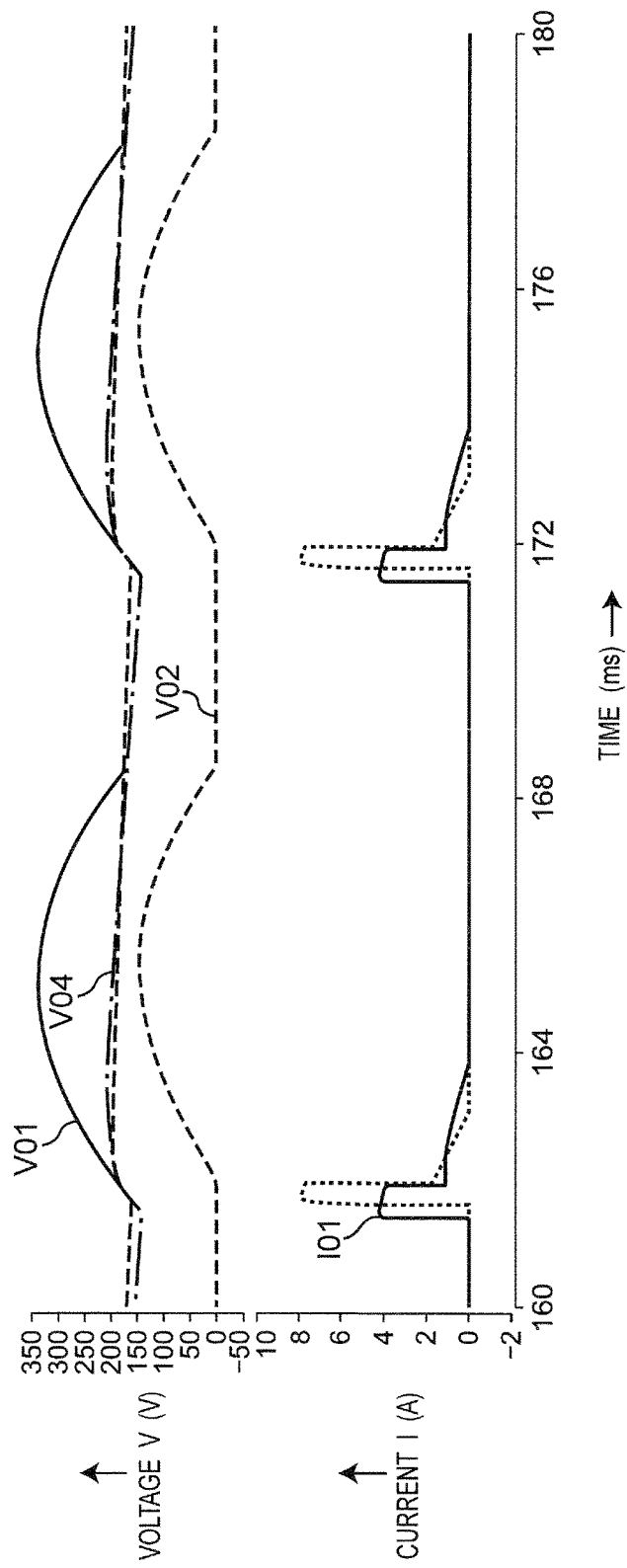
FIG. 31 is an enlarged chart of FIG. 30.

FIG. 29A is a circuit diagram showing a configuration example of an overvoltage protection circuit according to a fourth embodiment. In addition, FIG. 30 is a timing chart showing an operation example of the overvoltage protection circuit of FIG. 29A, and FIG. 31 is an enlarged chart of FIG. 30. Referring to FIG. 29A, the following points are different as compared with the overvoltage protection circuit according to the third embodiment of FIG. 25:

(1) an input capacitor 105 is divided into an input capacitor 111 and an input capacitor 112;

(2) a semiconductor switch 113 is inserted between the other end of an input capacitor 111 and a drain of a semiconductor switch 104;

(3) a control resistor 117 is inserted between an output terminal of a control circuit 103 and a gate of a semiconductor switch 113; and (4) a capacitor 118 and a protection diode 119 are inserted between the gate and a source of the semiconductor switch 113.

Hereinafter, the above differences will be described in detail.

Referring to FIG. 29A, the control resistor 117 and the capacitor 118 configure a low-pass filter for turning on or off the semiconductor switch 113, which configures a current change circuit 200D. In addition, the diode 119 is provided to protect a gate-source withstand voltage of the semiconductor switch 113.

In FIG. 30, I02 represents a current flowing through the input capacitor 112, I03 represents a current flowing through the input capacitor 111, and V09 represents a gate-source voltage of the semiconductor switch 113. An AC power supply 101 generates AC 100 V for an interval t1, AC 240 V for an interval t2, and AC 100 V for an interval t3.

FIG. 31 shows an enlarged waveform for the interval t2 of FIG. 30 and a waveform in which operation waveforms of the voltage V04 and the current I01 of FIG. 25 are displayed in combination. In FIG. 31, a broken line of a voltage or a current shows the operation waveforms of FIG. 25. In addition, in FIG. 31, a ratio of a capacitance C105 of the input capacitor 105 of FIG. 25, a capacitance C111 of the input capacitor 111 of FIG. 30, and a capacitance C112 of the input capacitor 112 is set by the following equation:

$$C105:C111:C112=2:1:1.$$

The purpose of the low-pass filter made up of the control resistor 117 and the capacitor 118 is to turn on the semiconductor switch 113 when the AC voltage of the AC power supply 101 is lower than a predetermined value and the voltage V01 is lower than a desired voltage. On the other hand, when the voltage of the AC power supply 101 is higher than the predetermined value and the voltage V01 exceeds the desired voltage, the semiconductor switch 113 is turned off. Therefore, when the voltage of the AC power supply 101 is lower than a predetermined value, the input capacitor 111 and the input capacitor 112 are connected in parallel and the capacitance increases, so that sufficient output power can be supplied even at low power input. In addition, when the voltage of the AC power supply 101 is higher than the predetermined value, the input capacitor 111 is clamped to a predetermined voltage or lower, and only the input capacitor 112 is connected. Therefore, the capacitance decreases and the loss of the semiconductor switch 104 at the on-time can be reduced. Hereinafter, the operation details will be described below.

Referring to FIG. 30, for the interval t1 of AC 100 V, the voltage of the AC power supply 101 is lower than the predetermined value and there is no need to clamp the voltage V04 applied to the input capacitor 112 and a load 106. Therefore, the control circuit 103 controls the semiconductor switch 104 so as to be always kept in an on-state. After a time T1 when the gate-source voltage of the semiconductor switch 113 exceeds a threshold voltage of the semiconductor switch 113, which has been set by a time constant of the low-pass filter made up of the control resistor 117 and the capacitor 118, the semiconductor switch 113 controls the semiconductor switch 104 so as to be in the on-state. Therefore, the capacitance of the input capacitor 112 is a sum of the capacitances of the input capacitor 111 and the input capacitor 112. The minimum value of the capacitance on the low voltage side can be set by a sum of the capacitances of this input capacitor 111 and the input capacitor 112.

Next, for the interval t2 of AC 240 V, the voltage of the AC power supply 101 is higher than the predetermined value, and it is necessary to clamp the voltage V04 applied to the input capacitor 112 and the load 106. Therefore, the control circuit 103 turns off the semiconductor switch 104 when the voltage V01 exceeds a desired voltage. Thereafter, the voltage V04 is lowered by the load 106, and when the voltage V02 becomes zero or sufficiently small, the semiconductor switch 104 is turned on. When the voltage V01 exceeds the desired voltage again, the semiconductor switch 104 is turned off (for the interval t3). This operation is repeated. The ON-interval of the semiconductor switch 104 at this time is referred to as $\tau 4$.

Meanwhile, the semiconductor switch 113 is switched from AC 100 V for the interval t1 to AC 240 V for the interval t2 by setting the control resistor 117 and the capacitor 118 such that $\tau 4 < \tau 1$, then the voltage V09 decreases. Then, the semiconductor switch 104 is switched from the on-state to the off-state, and the off-state is maintained. As a result, the capacitance is divided into only the input capacitor 112, and the capacitance can be reduced as compared with the capacitance for the interval t1. The current flowing at the timing when the semiconductor switch 104 is turned on is proportional to the capacitance of the input capacitor 112. Thus, lowering the capacitance enables lowering of the peak value of the current I01 and reduction in the loss of the semiconductor switch 104.

Specifically, as is apparent from FIG. 31, for example, a ratio between the capacitance C111 of the input capacitor 111 and the capacitance C112 of the input capacitor 112 is set as follows.

$$C111:C112=1:1.$$

At this time, the current which flows when the semiconductor switch 104 is turned on is reduced to about a half as compared with the case where the capacitance is not divided. When the power consumed by the load 106 is the same, the voltage discharged from the input capacitor 112 is about twice. Therefore, the conduction time of the semiconductor switch 113 is about twice as compared with the case where the capacitance is not divided. Since the loss generated in the semiconductor switch 104 is calculated by the square of the current, it is possible to reduce the loss to about a half as compared with the case where the capacitance is not divided. Due to an increase in energy stored in the capacitance with the square of the voltage, in the case of clamping with a high voltage equal to or higher than a predetermined value, it is possible to set the capacitance so as not to fall below the minimum operating voltage even when the capacitance becomes small.

For the interval t3 of AC 100 V, in a manner similar to the interval t1, the control circuit 103 controls the semiconductor switch 104 so as to be always kept in the on-state. After the interval $\tau 1$, the semiconductor switch 113 switches from the off-state to the on-state and maintains the on-state. Therefore, the capacitance of the input capacitor 112 is a sum of the capacitances of the input capacitor 111 and the input capacitor 112.

Figure 29B:
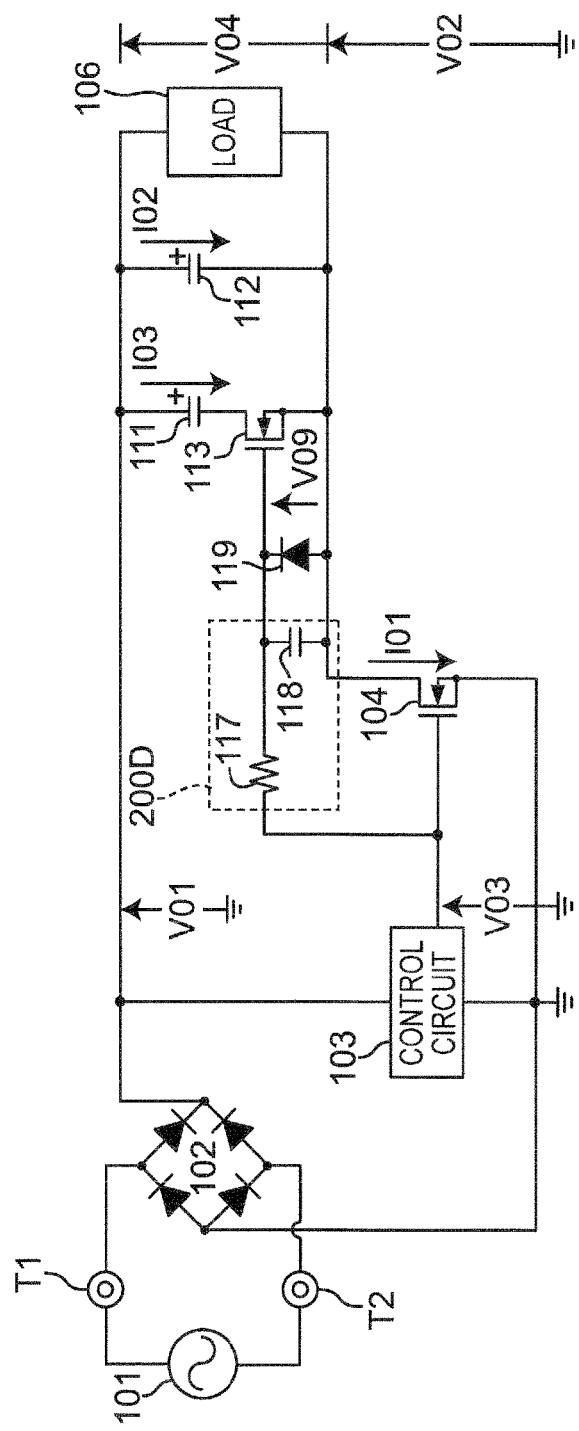
FIG. 29B is a circuit diagram showing a configuration example of an overvoltage protection circuit according to a modified preferred embodiment of the fourth preferred embodiment.

FIG. 29B is a circuit diagram showing a configuration example of an overvoltage protection circuit according to a modified embodiment of the fourth embodiment. Referring to FIG. 29B, it is characterized in that the resistor 116 and the capacitor 115 are removed as compared with the overvoltage protection circuit of FIG. 29A. This configuration includes the current change circuit 200D which is an essential configuration of the fourth embodiment and can achieve an object of the present invention.

As described above, according to the fourth embodiment and its modified embodiment, the input capacitor 105 of the third embodiment is divided into the input capacitor 111 and the input capacitor 112, and the semiconductor switch 113 is inserted between the other end of the input capacitor 111 and the drain of the semiconductor switch 104. In addition, the current change circuit 200D which is the low-pass filter made up of the control resistor 117 and the capacitor 118 is connected to the gate of the semiconductor switch 113. It is thus possible to solve the problems described above in the third embodiment and change the fluctuation of the current 101 gradually as compared with the conventional example. This enables lowering of the conduction disturbing wave voltage to a predetermined value or smaller.

Referring to FIGS. 29A and 29B, a plurality of series circuits of the input capacitor 111 and the semiconductor switch 113 and a plurality of control circuits thereof may be provided. In addition, the control circuit may be provided in at least a part of the input capacitor 112 and the plurality of input capacitors 111.

It is possible to apply a switching converter to the load 106 of the overvoltage protection circuit according to the first to fourth embodiments, an example of which will be proposed below.

Fifth Embodiment

Before a power supply apparatus according to a fifth embodiment is described, problems in the comparison example will be described below.

Figure 32:
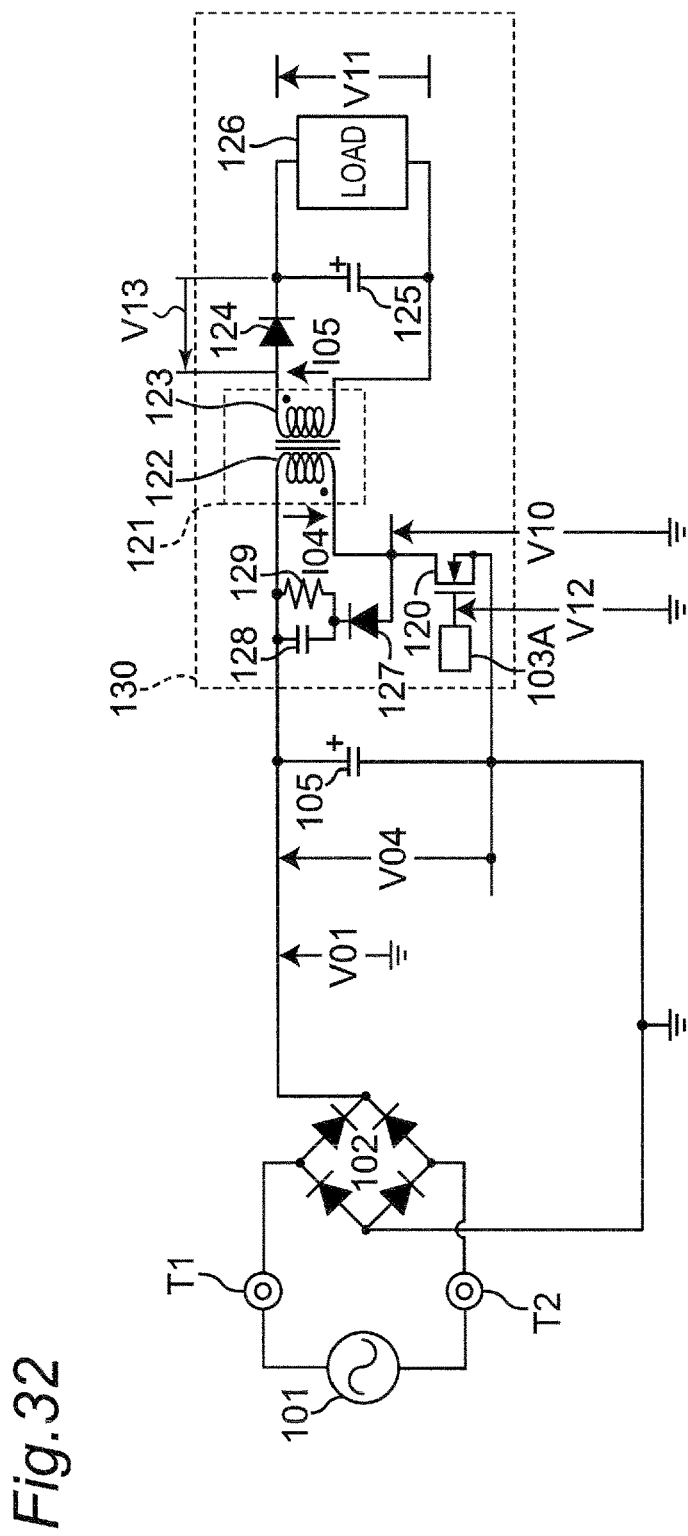
FIG. 32 is a circuit diagram showing a configuration example of a power supply apparatus according to a comparison example.

FIG. 32 is a circuit diagram showing a configuration example of a power supply apparatus according to a comparison example. FIG. 32 illustrates, as a load 106, a power supply apparatus to which an pseudo resonant flyback converter 130, disclosed in Patent Document 2, has been applied. In this case, the pseudo resonant flyback converter 130 includes a semiconductor switch 120, a capacitor 128, a diode 127, a switching transformer 121, a secondary side rectifier diode (hereinafter, referred to as a rectifier diode) 124, an output capacitor 125, a load 126, and a control circuit 103A.

Referring to FIG. 32, an AC power supply 101 outputs an AC voltage to a rectifier circuit 102 via input terminals T1 and T2, and the rectifier circuit 102 full-wave rectifies the AC voltage. A full-wave rectified voltage V01 is outputted to an input capacitor 105 and the pseudo resonant flyback converter 130 connected in parallel with the rectifier circuit 102. The pseudo resonant flyback converter 130 includes a primary winding 122 and a secondary winding 123 that are electrically insulated from each other. In this case, the primary winding 122 and the semiconductor switch 120 are connected in parallel with the input capacitor 105, and, in addition, the primary winding 122 and the semiconductor switch 120 are connected in series. A series circuit of the diode 127, the capacitor 128 and a resistor 129 is connected in parallel with the primary winding 122. One end of the diode 127 is connected to one end of a series circuit of the capacitor 128 and the resistor 129, and the other end of the diode 127 is grounded via the semiconductor switch 120. In this case, the semiconductor switch 120 is on/off controlled by control means from a rectifier circuit 103A. Further, a series circuit of the rectifier diode 124 and the output capacitor 125 is connected in parallel with the secondary winding 123, and the load 126 is connected in parallel with the output capacitor 125.

In the pseudo resonant flyback converter 130 which is a known technique disclosed in Patent Document 2, a resonance phenomenon between an inductance of the primary winding 122 of the switching transformer 121 and a drain-source capacitance of the semiconductor switch 120 is used. With this, the control circuit 103A turns on the semiconductor switch 104 at the timing when a resonance voltage reaches a predetermined minimum voltage, which has been already known and has hitherto been used widely.

In this case, the loss of the semiconductor switch 120 at the timing when the pseudo resonant flyback converter 130 is turned on is proportional to the square of the drain-source voltage. However, in the pseudo resonant flyback converter 130, the semiconductor switch 120 is turned on at the timing when the resonance voltage reaches the predetermined minimum voltage, namely, at the timing when the drain-source voltage becomes the minimum. For this reason, the loss can be reduced as compared with a normal flyback converter.

In the power supply apparatus configured as described above, the input voltage of the pseudo resonant flyback converter 130 is V04, and the output voltage of the pseudo resonant flyback converter 130 is V11. In addition, the forward voltage of the rectifier diode 124 is V13, the number of windings of the primary winding 122 of the switching transformer 121 is N1, and the number of windings of the secondary winding 123 is N2. At this time, a drain-source voltage Vdson at the timing when the semiconductor switch 120 is turned on can be approximated by the following equation:

$$Vdson \approx V04 - (V11 + V13) \times N1/N2 \quad (1).$$

In addition, when $V04 < (V11 + V13) \times N1/N2$, the drain-source voltage of the semiconductor switch 120 falls below zero, and the body diode of the semiconductor switch 120 comes into a conducting state. When the semiconductor switch 120 is turned on at this timing, zero voltage switching (ZVS) occurs, and the switching loss at the timing when the semiconductor switch 120 is turned on can be reduced greatly. In this case, making ZVS requires an increase in a turn ratio (N1/N2) or lowering of the voltage V04. However, when the turn ratio (N1/N2) is increased, the drain-source voltage during the timing when the semiconductor switch 120 is off is approximately calculated by the above equation (1), so that it is necessary to increase the withstand voltage of the semiconductor switch 120 and there is thus a disadvantage of increase in cost and parts size. In addition, when the power supply apparatus is a worldwide specification, the voltage V04 changes in a wide range (for example, about 120 V to 372V), and hence it is difficult to make ZVS at a high voltage.

Therefore, applying the overvoltage protection circuit described above to the front stage of the pseudo resonant flyback converter 130 enables setting of V04 to a desired voltage (for example, 140 V) or smaller even in the worldwide specification, so that it is possible to facilitate making ZVS. In addition, as can be seen from the fact that the drain-source voltage during the timing when the semiconductor switch 120 is off is approximately calculated by the above equation (1), applying the overvoltage protection circuit enables setting of the voltage V04 to the desired voltage or smaller. Therefore, it is possible to apply a relatively low withstand voltage semiconductor switch as the semiconductor switch 120 and to reduce the cost and the parts size. Therefore, low withstand voltage parts are applicable not only to the semiconductor switch 120 but also to other parts in the same manner.

Next, the power supply apparatus according to the fifth embodiment will be described below.

Figure 33:
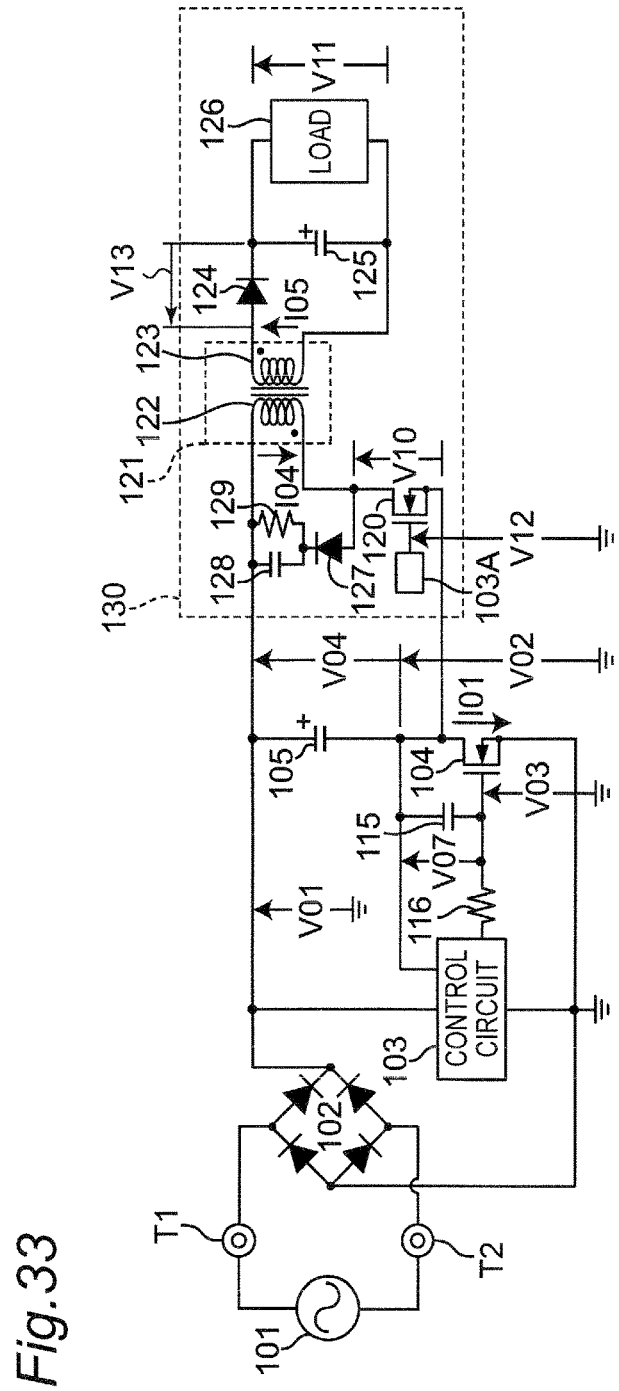
FIG. 33 is a circuit diagram showing a configuration example of a power supply apparatus according to a fifth preferred embodiment.
Figure 34:
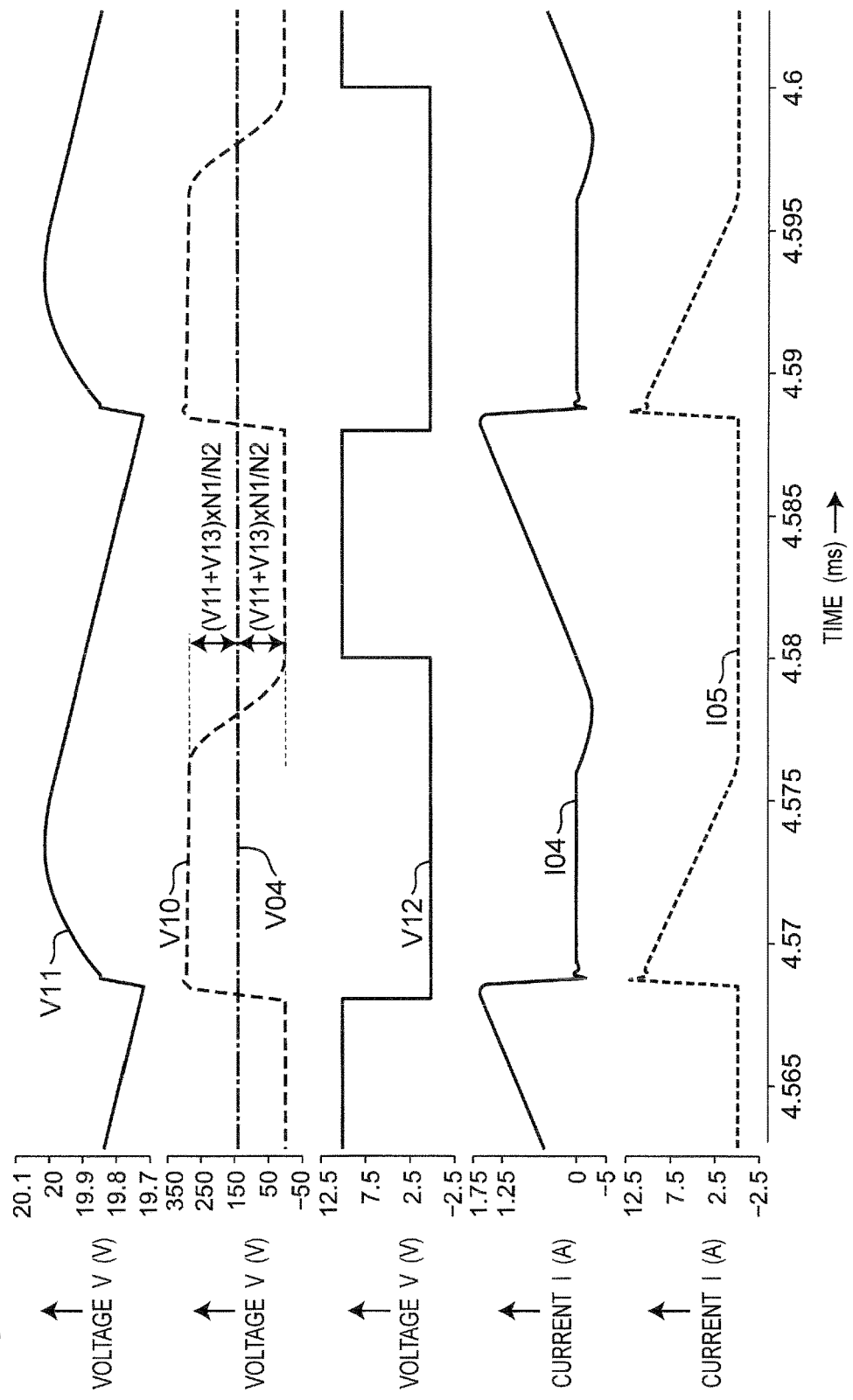
FIG. 34 is a timing chart showing an operation example at a timing when a pseudo resonant flyback converter 130 is caused to perform a pseudo resonant operation in the power supply apparatus of FIG. 33.

FIG. 33 is a circuit diagram showing a configuration example of the power supply apparatus according to the fifth embodiment. In addition, FIG. 34 is a timing chart showing an operation example at the timing when a pseudo resonant flyback converter 130 is caused to perform a pseudo resonant operation in the power supply apparatus of FIG. 33.

FIG. 33 shows the power supply apparatus to which the pseudo resonant flyback converter 130 has been applied as the load of the overvoltage protection circuit according to the third embodiment of FIG. 25.

Referring to FIG. 33, a voltage V04 is the voltage across the input capacitor 105 of the overvoltage protection circuit of FIG. 25 and is the input voltage of the pseudo resonant flyback converter 130. A voltage V10 is a drain-gate voltage of a semiconductor switch 120, and a voltage V12 is a gate-source voltage of a semiconductor switch 120. A voltage V11 is the output voltage of the pseudo resonant flyback converter 130. A current I04 is a current flowing through a primary winding 122 of a switching transformer 121 during the timing when the semiconductor switch 120 is on. A current I05 is a current flowing through a secondary winding 123 of the switching transformer 121 during the timing when the semiconductor switch 120 is off. Further, a voltage V13 is a forward voltage of a rectifier diode 124.

The power supply apparatus according to the fifth embodiment configured as described above has the following specific functions and effects:

(1) applying the overvoltage protection circuit described above to the front stage of the pseudo resonant flyback converter 130 enables setting of V04 to a desired voltage (for example, 140 V) or smaller even in the worldwide specification, so that it is possible to facilitate making ZVS; and (2) as can be seen from the fact that the drain-source voltage during the time when the semiconductor switch 120 is off is approximately calculated by the above equation (1), applying the overvoltage protection circuit enables setting of the voltage V04 to the desired voltage or smaller. Therefore, it is possible to apply a relatively low withstand voltage semiconductor switch as the semiconductor switch 120 and to reduce the cost and the parts size. Therefore, low withstand voltage parts are applicable not only to the semiconductor switch 120 but also to other parts in the same manner.

In the power supply apparatus according to the fifth embodiment, the pseudo resonant flyback converter 130 has been applied as the load of the overvoltage protection circuit according to the third embodiment of FIG. 25. However, the present invention is applicable not only to the pseudo resonant flyback converter 130 but also to other types of switching DC/DC converters, and it is possible to obtain the similar function and effect. In addition, as the load of the overvoltage protection circuit according to the other embodiments which are the first, second, and fourth embodiments, the pseudo resonant flyback converter 130 or another type of switching DC/DC converter may be used.

In each of the above embodiments, both at the timing when the semiconductor switch 104 is turned off and when turned on, the control voltage for the semiconductor switch 104 is generated in order to gradually change the current flowing through the semiconductor switch 104 such that the conduction disturbing wave voltage in the output voltage output from the overvoltage protection circuit becomes equal to or smaller than a predetermined value. However, the present invention is not limited to this, and at least either at the timing when the semiconductor switch 104 is turned off or when turned on, the control voltage for the semiconductor switch 104 may be generated in order to gradually change the current flowing through the semiconductor switch 104 such that the conduction disturbing wave voltage in the output voltage output from the overvoltage protection circuit becomes equal to or smaller than a predetermined value.

In addition, a combination of each of the embodiments may be configured. For example, the first modified embodiment and the second modified embodiment may be applied to the second to fifth embodiments.

PRIOR ART DOCUMENTS

Patent Documents

Patent Document 1: Japanese Patent Laid-open Publication No. JP2004-187391A
Patent Document 2: Japanese Patent Laid-open Publication No. JP2012-157085A Non-Patent Documents Non-Patent Document 1: "An Isolated AC/DC Converter with two active-clamp circuits for low power applications" Kimihiro Nishijima, et al., the Institute of Electronics, Information and Communication Engineers (IEICE) Technical Committee Paper, Energy Engineering in Electronics and Communications, EE2016-39, Vol. 116, No. 329, pp. 51-57, issued on Nov. 21, 2016

Non-Patent Document 2: Information communication council's report, Consultation No. 3 "About various standards of the International Special Committee on Radio Interference (CISPR)", "Allowable value and measurement method of disturbing waves from information technology equipment", FY 2010, Dec. 21, 2010

What is claimed is:

1. An overvoltage protection circuit connected between a rectifier circuit that rectifies an AC voltage to output a rectified voltage and a load including an input capacitor element connected to both ends of the load, the overvoltage protection circuit comprising:
   a semiconductor switch connected between the rectifier circuit and the load; and
   a control circuit that controls the semiconductor switch to be turned on or off,
   wherein, when the rectified voltage exceeds a predetermined value, the control circuit turns off the semiconductor switch, and detects a voltage potential difference between both ends of the semiconductor switch, and then, for an interval when the voltage potential difference is zero or a predetermined minute value, the control circuit generates a control voltage for turning on the semiconductor switch, and outputs the control voltage to a control terminal of the semiconductor switch, and
   wherein the overvoltage protection circuit comprises a current change circuit that gradually changes a current flowing through the semiconductor switch such that a conduction disturbing wave voltage in an output voltage output from the overvoltage protection circuit becomes equal to or lower than a predetermined value at least one of (A) a timing when the semiconductor switch is turned off and (B) a timing when the semiconductor switch is turned on.

2. The overvoltage protection circuit as claimed in claim 1,
   wherein the current change circuit comprises an inductor inserted between the semiconductor switch and the rectifier circuit.

3. The overvoltage protection circuit as claimed in claim 1,
   wherein the current change circuit comprises the control circuit including a current control circuit that generates the control voltage for gradually changing a current flowing through the semiconductor switch.

4. The overvoltage protection circuit as claimed in claim 3,
wherein the current control circuit further comprises a resistor inserted between the semiconductor switch and the rectifier circuit,
wherein the overvoltage protection circuit further comprises a low-pass filter that low-pass filters for generating a reference voltage generated at a timing which is based on the rectified voltage and a voltage at a connection point between the semiconductor switch and the load, and
wherein the overvoltage protection circuit generates the control voltage such that a voltage across the resistor coincides with the reference voltage.

5. The overvoltage protection circuit as claimed in claim 3,
wherein the current control circuit further comprises a resistor inserted between the semiconductor switch and the rectifier circuit,
wherein the overvoltage protection circuit further comprises a constant current source for generating a reference voltage generated at timing which is based on the rectified voltage and a voltage at a connection point between the semiconductor switch and the load, and
wherein the overvoltage protection circuit generates the control voltage such that a voltage across the resistor matches the reference voltage.

6. The overvoltage protection circuit as claimed in claim 3,
wherein the current control circuit further comprises a resistor inserted between the semiconductor switch and the rectifier circuit,
wherein the overvoltage protection circuit further comprises a triangular wave current source for generating a reference voltage generated at timing based on the rectified voltage and a voltage at a connection point between the semiconductor switch and the load, and
wherein the overvoltage protection circuit generates the control voltage such that a voltage across the resistor matches the reference voltage.

7. The overvoltage protection circuit as claimed in claim 1,
wherein the current change circuit comprises:
a feedback capacitor inserted between a control terminal of the semiconductor switch and a connection point between the load and the semiconductor switch; and
a control resistor inserted between the control circuit and the control terminal of the semiconductor switch.

8. The overvoltage protection circuit as claimed in claim 1,
wherein the input capacitor element comprises a plurality of input capacitors connected in parallel with each other, and
wherein the overvoltage protection circuit further comprises a further semiconductor switch that is connected in series with at least one input capacitors, which is a part of the input capacitors selected from the plurality of input capacitors.

9. A power supply apparatus for supplying a power supply voltage, the power supply apparatus comprising an overvoltage protection circuit,
wherein the overvoltage protection circuit is connected between a rectifier circuit that rectifies an AC voltage to output a rectified voltage and a load including an input capacitor element connected to both ends of the load,
wherein the overvoltage protection circuit comprises:
a semiconductor switch connected between the rectifier circuit and the load; and
a control circuit that controls the semiconductor switch to be turned on or off,
wherein, when the rectified voltage exceeds a predetermined value, the control circuit turns off the semiconductor switch, and detects a voltage potential difference between both ends of the semiconductor switch, and then, for an interval when the voltage potential difference is zero or a predetermined minute value, the control circuit generates a control voltage for turning on the semiconductor switch, and outputs the control voltage to a control terminal of the semiconductor switch, and
wherein the overvoltage protection circuit comprises a current change circuit that gradually changes a current flowing through the semiconductor switch such that a conduction disturbing wave voltage in an output voltage output from the overvoltage protection circuit becomes equal to or lower than a predetermined value at least at one of (A) a timing when the semiconductor switch is turned off and (B) a timing when the semiconductor switch is turned on.

* * * * *